US009845380B2

(12) United States Patent
Bara et al.

(10) Patent No.: US 9,845,380 B2
(45) Date of Patent: Dec. 19, 2017

(54) IONIC POLYIMIDE MATERIALS AND METHODS OF USE

(71) Applicant: The Board of Trustees of the University of Alabama, Tuscaloosa, AL (US)

(72) Inventors: Jason Edward Bara, Tuscaloosa, AL (US); Matthew S. Shannon, Northport, AL (US); John David Roveda, Jr., Mobile, AL (US); David A. Wallace, Brentwood, TN (US); Max Simon Mittenthal, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 104 days.

(21) Appl. No.: 14/982,386

(22) Filed: Dec. 29, 2015

(65) Prior Publication Data
US 2016/0185909 A1 Jun. 30, 2016

Related U.S. Application Data

(60) Provisional application No. 62/098,068, filed on Dec. 30, 2014.

(51) Int. Cl.
*B01D 53/22* (2006.01)
*B01D 71/64* (2006.01)
(Continued)

(52) U.S. Cl.
CPC ....... *C08G 73/1085* (2013.01); *B01D 53/228* (2013.01); *B01D 71/64* (2013.01);
(Continued)

(58) Field of Classification Search
CPC ............ B01D 53/1475; B01D 53/1493; B01D 53/228; B01D 71/64; B01D 2252/30;
(Continued)

(56) References Cited

U.S. PATENT DOCUMENTS 4,113,628 A * 9/1978 Alegranti ............... B01D 71/64
210/500.23
4,574,144 A * 3/1986 Yates, III ........... C08G 73/1067
525/434
(Continued)

OTHER PUBLICATIONS

Wiegand, et al., "Synthesis and characterization of triptycene-based polyimides with tunable high fractional free volume for gas separation membranes", J. Mater. Chem. A 2014, 2, (33), 13309-13320.
(Continued)

*Primary Examiner* — Jason M Greene
(74) *Attorney, Agent, or Firm* — Meunier Carlin & Curfman LLC

(57) ABSTRACT

Disclosed are compositions and methods of preparing ionic polyimides. Also disclosed are methods to tune the properties of the ionic polyimide by designing the components of the ionic polyimide. Additionally, disclosed herein is a composition comprising an ionic polyimide. Also disclosed herein is a composition comprising an ionic polyimide and an ionic liquid. The disclosed compositions can be utilized to capture gases.

27 Claims, 1 Drawing Sheet

(51) Int. Cl.

| | |
|---|---|
| C08G 73/10 | (2006.01) |
| C08K 5/3445 | (2006.01) |
| C08G 73/06 | (2006.01) |
| B01J 20/26 | (2006.01) |
| B01J 20/28 | (2006.01) |
| B01D 53/14 | (2006.01) |

(52) U.S. Cl.
CPC ........... B01J 20/262 (2013.01); B01J 20/264 (2013.01); B01J 20/28033 (2013.01); C08G 73/0616 (2013.01); C08G 73/1039 (2013.01); C08G 73/1067 (2013.01); C08K 5/3445 (2013.01); B01D 53/1475 (2013.01); B01D 53/1493 (2013.01); B01D 2252/30 (2013.01); B01D 2257/504 (2013.01); Y02C 10/10 (2013.01); Y02P 20/152 (2015.11)

(58) Field of Classification Search
CPC .......... B01D 2257/504; C08G 73/1039; C08G 73/1067; C08G 73/1085; C08G 73/0616; B01J 20/262; B01J 20/264; B01J 20/28033

See application file for complete search history.

(56) References Cited

U.S. PATENT DOCUMENTS

| | | | | |
|---|---|---|---|---|
| 5,198,316 | A * | 3/1993 | Wernet | B01D 71/64 210/651 |
| 2012/0186446 | A1 * | 7/2012 | Bara | B01D 53/228 95/44 |
| 2014/0130668 | A1 * | 5/2014 | Sano | C08G 73/1039 95/51 |
| 2015/0209776 | A1 * | 7/2015 | Gin | B01D 71/64 95/51 |

OTHER PUBLICATIONS

An, et al., "Tuning MOF CO2 Adsorption Properties via Cation Exchange", J. Am. Chem. Soc. 2010, 132, (16), 5578-5579.
Anderson, et al., "Imidazole- and imidazolium-containing polymers for biology and material science application", Polymer 2010, 51, (12), 2447-2454.
Bara, et al., "3D printing for CO2 capture and chemical engineering design", Nanomater. Energy 2013, 2, 235-243.
Bara, et al., "Beyond 1, 3-difunctionalized imidazolium cations", Nanomater. Energy 2012, 1, (4), 237-242.
Bara, et al., "COSMOTherm as a Tool for Estimating the Thermophysical Properties of Alkylimidazoles as Solvents for CO2 Separations", Ind. Eng. Chem. Res. 2013, 52, (15), 5498-5506.
Bara, et al., "Effect of "Free" Cation Substituent on Gas Separation Performance of Polymer-Room-Temperature Ionic Liquid Composite Membranes", Ind. Eng. Chem. Res 2009, 48, (9), 4607-4610.
Bara, et al., "Effect on Anion on Gas Separation Performance of Polymer-Room-Temperature Ionic Liquid Composite Membranes", Ind. Eng. Chem. Res. 2008, 47, (24), 9919-9924.
Bara, et al., "Enhanced CO2 Separation Selectivity in Ologo(ethylene glycol) Functionalized Room-Temperature Ionic Liquids", Ind. Eng. Chem. Res. 2007, 46, (16), 5380-5386.
Bara, et al., "Gas separation in fluoroalkyl-functionalized room-temperature ionic liquids using supported liquid membranes", Chemical Engineering Journal 2009, 147, (1), 43-50.
Bara, et al., "Guide to CO2 Separation in Imidazolium-Based Room-Temperature Ionic Liquids", Ind. Eng. Chem. Res 2009, 48, (6), 2739-2751.
Bara, et al., "Improving CO2 permeability in polymerized room-temperature ionic liquid gas separation membranes through the formation of a solid composite with a room-temperature ionic liquid", Polymers for advanced technologies 2008, 19, (10), 1415-1420.
Bara, et al., "Improving CO2 selectivity in polymerized room-temperature ionic liquid gas separation membranes through incorporation of polar substituents", Journal of Membrane Science 2008, 321 (1), 3-7.
Bara, et al., "Influence of nanostructure on light gas separation in cross-linked lyotropic liquid crystal membranes", Journal of Membrane Science 2007, 288, (1-2), 13-19.
Bara, et al., "Synthesis and light gas separation in cross-linked gemini room temperature ionic liquid polymer membranes", Journal of Membrane Science 2008, 316, (1-2), 186-191.
Bara, et al., "Synthesis and performance of polymerizable room-temperature ionic liquids as gas separation membranes", Ind. Eng. Chem. Res. 2007, 46, (16), 5397-5404.
Bara, et al., "Thermotropic liquid crystal behaviour of gemini imidazolium-based ionic amphiphiles", Liquid Crystals 2010, 37, (12), 1587-1599.
Bara, et al., "Versatile and Scalable Method for Producing N-Functionalized Imidazoles", Industrial & Engineering Chemistry Research, 2011, 13614-13619.
Bara, et al., "What chemicals will we need to capture CO2?", Greenhouse Gases: Sci. Technol. 2012, (3), 162-171.
Bara, Jason E. et al., "Room-Temperature Ionic Liquids and Composite Materials: Platform Technologies for CO2 Capture", Accounts of Chemical Research, 2010, 43, (1) 152-159.
Bates, et al., "CO2 capture by a task-specific ionic liquid", J. the Am. Chem. Soc. 2002, 124, (6), 926-927.
Binnemans, et al., "Ionic liquid crystals", Chem. Rev. 2005, 105, (11), 4148-4204.
Budd, et al., "Gas permeation parameters and other physicochemical properties of a polymer of intrinsic microporosity: Polybenzodioxane PIM-1", J. Membr. Sci. 2008, 325, (2), 851-860.
Budd, et al., "Gas separation membranes from polymers of intrinsic microporosity", J. Membr. Sci. 2005, 251, (1-2), 263-269.
Camper, et al., "Bulk-fluid solubility and membrane feasibility of Rmim-based room-temperature ionic liquids", Indust. Eng. Chem. Res 2006, 45(18), 6279-6283.
Camper, et al., "Room-temperature Ionic Liquid-Amine Solutions: Tunable Solvents for Efficient and Reversible Capture of CO2", Indust. Eng. Chem. Res 2008, 47(21), 8496-8498.
Carlisle, et al., "CO2/light gas separation performance of cross-linked poly(vinylimidazolium) gel membranes as a function of ionic liquid loading and cross-linker content", J. Membr. Sci. 2012, 397-398, 24-37.
Carlisle, et al., "Ideal CO2/Light Gas Separation Performance of Poly(vinylimidazolium) Membranes and Poly(vinylimidazolium)-Ionic Liquid Composite Films", Ind. Eng. Chem. Res. 2013, 52, (3), 1023-1032.
Carlisle, et al., "Interpretation of CO2 Solubility and Selectivity in Nitrile-Functionalized Room-Temperature Ionic Liquids Using a Group Contribution Approach", Ind. Eng. Chem. Res 2008, 47(18), 7005-7012.
Carlisle, et al., "Main-chain imidazolium polymer membranes for CO2 separations: An initial study of a new ionic liquid-inspired platform", Journal of Membrane Science, 2010, 359, (1-2), 37-43.
Carlisle, et al., "Vinyl-Functionalized Poly(imidazolium)s: A Curable Polymer Platform for Cross-Linked Ionic Liquid Gel Synthesis", Chem. Mater. 2014, 26, (3), 1294-1296.
Carter, et al., "Glycerol-Based Bicontinuous Cubic Lyotropic Liquid Crystal Monomer System for the Fabrication of Thin-Film Membranes with Uniform Nanopores", Chem. Mater. 2012, 24, (21), 4005-4007.
Chen, et al., "Metal-Organic Frameworks with Functional Pores for Recognition of Small Molecules", Acc. Chem. Res. 2010, 43, (8), 1115-1124.
Emmler, "Free Volume Investigation of Polymers of Intrinsic Microporosity (PIMs): PIM-1 and PIM1 Copolymers Incorporating Ethanoanthracene Units", Macromolecules 2010, 43, (14), 6075-6084.
Finotello, et al., "Ideal Gas Solubilities and Solubility Selectivities in a Binary Mixture of Room-Temperature Ionic Liquids", J. Phys. Chem. B 2008, 112, (8), 2335-2339.

(56) References Cited

OTHER PUBLICATIONS

Finotello, et al., "Room-Temperature Ionic Liquids: Temperature Dependence of Gas Solubility Selectivity", Indust. Eng. Chem. Res. 2008, 47(10), 3453-3459.
Fumino, et al., "The influence of hydrogen bonding on the physical properties of ionic liquids", Phys. Chem. Chem. Phys. 2011, 13, (31), 14064-14075.
Furukawa, et al., "Ultrahigh Porosity in Metal-Organic Frameworks", Science 2010, 329, (5990), 424-428.
Gan, et al., ".An experimental study of gas transport and separation properties of ionic liquids supported on nanofiltration membranes", J. Membr. Sci. 2006, 280, (1+2), 948-956.
Garist, et al., "Building Blocks for Ionic Liquids: Vapor Pressures and Vaporization Enthalpies of Alkoxy Derivatives of Imidazole and Benzimidazole", Ind. Eng. Chem. Res. 2012, 51, (47), 15517-15524.
Garist, et al., "Building Blocks for Ionic Liquids: Vapor Pressures and Vaporization Enthalpies of 1-(n-Alkyl)-benzimidazoles", J. Chem. Eng. Data 2012, 57, (6), 1803-1809.
Ghanem, et al., ".Synthesis, Characterization, and Gas Permeation Properties of a Novel Group of Polymers with Intrinsic Microporosity: PIM-Polyimides", Macromolecules 2009, 42, (20), 7881-7888.
Gin, et al., "Designing the next generation of chemical separation membranes", Science 2011, 332, 674-676.
Green, et al., "Tailoring macromolecular architecture with imidazole functionality: A perspective for controlled polymerization processes", . Eur. Polymer J. 2011, 47, (4), 486-496.
Gu, et al., "ABA-triblock copolymer ion gels for CO2 separation applications", J. Membr. Sci. 2012, 423-424, 20-26.
Gu, et al., "Synthesis and Gas Separation Performance of Triblock Copolymer Ion Gels with a Polymerized Ionic Liquid Mid-Block", Macromolecules 2011, 44, (7), 1732-1736.
Guo, et al., "Vapor phase growth of bismuth telluride nanoplatelets on flexible polyimide films", ECS Solid State Lett. 2013, 2, (2), 19-21.
Gupta, et al., ".Metal-organic framework supported ionic liquid membranes for CO2 capture: anion effects", Phys. Chem. Chem. Phys. 2012, 14, (16), 5785-5794.
Hamilton, et al., "Enhancing the Pre-Polymerization Coordination of 1-Vinylimidazole", Chem. Eng. Sci., 2015.
He, et al., ".A thermoreversible ion gel by triblock copolymer self-assembly in an ionic liquid", Chem. Commun. 2007, (26), 2732-2734.
He, et al., "Ion Gels by Self-Assembly of a Triblock Copolymer in an Ionic Liquid", J. Phys. Chem. B 2007, 111, (18), 4645-4652.
He, et al., "Self-Assembly of Block Copolymer Micelles in an Ionic Liquid", J. Am. Chem. Soc. 2006, 128, (8), 2745-2750.
Hindman, et al., "Synthesis of 1,2-dialkyl-, 1,4(5)-dialkyl-, and 1,2,4(5)-trialkylimidazoles via a one-pot method", Ind. Eng. Chem. Res. 2013, 52, (34), 11880-11887.
Hou, et al., "Unraveling the High Uptake and Selectivity of CO2 in the Zeolitic Imidazolate Frameworks ZIF-68 and ZIF-69", J. Phys. Chem. C 2010, 114, (32), 13501-13508.
Hudiono, et al., "Novel mixed matrix membranes based on polymerizable room-temperature ionic liquids and SAPO-34 particles to improve CO2 separation", J. Membr. Sci. 2011, 370, (1-2), 141-148.
Ichikawa, et al., "3D Interconnected Ionic Nano-Channels Formed in Polymer Films: Self-Organization and Polymerization of Thermotropic Bicontinuous Cubic Liquid Crystals", J. Am. Chem. Soc. 2011, 133, 2163-2169.
Ichikawa, et al., "Self-organization of room-temperature ionic liquids exhibiting liquid-crystalline bicontinuous cubic phases: Formation of nano-ion channel networks", J. Am. Chem. Soc. 2007, 129, 10662-10663.
Kanehashi, et al., "CO2 separation properties of a glassy aromatic polyimide composite membranes containing high-content 1-butyl-3-methylimidazolium bis(trifluoromethylsulfonyl)imide ionic liquid", J. Membr. Sci. 2013, 430, 211-222.
Kato, et al., "From Nanostructured Liquid Crystals to Polymer-Based Electrolytes", Angew. Chem., Int. Ed. 2010, 49, 7847-7848.
Keskin, et al., "Can Metal-Organic Framework Materials Play a Useful Role in Large-Scale Carbon Dioxide Separations?", ChemSusChem 2010, 3, (8), 879-891.
Kim, et al., "Relationship between gas separation properties and chemical structure in a series of aromatic polyimides", J. Membr. Sci. 1988, 37, (1), 45-62.
Koros, et al., "Pushing the limits on possibilities for large scale gas separation: which strategies?" J. Membr. Sci. 2000, 175, (2), 181-196.
Laciak, et al., "Molten salt facilitated transport membranes. Part 2. Separation of ammonia from nitrogen and hydrogen at high temperatures", J. Membr. Sci. 1992, 65, (1-2), 31-38.
Li, et al., "CO(2) Separation from Flue Gas Using Polyvinyl-(Room Temperature Ionic Liquid)-Room Temperature Ionic Liquid Composite Membranes", . Ind. Eng. Chem. Res. 2011, 50, (15), 9344-9353.
Li, et al., "High performance membranes based on ionic liquid polymers for CO2 separation from the flue gas", Green Chem. 2012, 14, 1052-1063.
Li, et al., "Synthesis of copolyimides based on room temperature ionic liquid diamines", J. Polym. Sci., Part A: Polym. Chem. 2010, 48, (18), 4036-4046.
Li, et al., "Synthesis of room temperature ionic liquids based random copolyimides for gas separation applications", Eur. Polym. J. 2013, 49, (2), 482-491.
Lin, et al., "Gas transport properties of 6FDA-durene/1,4-phenylenediamine (pPDA) copolyimides", J. Polym. Sci., Part B: Polym. Phys. 2000, 38, (21), 2703-2713.
Liu, et al., "DFT study on the effect of exocyclic substituents on the proton affinity of 1-methylimidazole.", Chem. Phys. 2013, 416, 21-25.
Liu, et al., "Electrostatic Potential within the Free Volume Space of Imidazole-Based Solvents: Insights into Gas Absorption Selectivity", J. Phys. Chem. B 2014, 118, (1), 255-264.
Liu, et al., "Molecular Simulation Studies of Separation of CO2/N-2, CO2/CH4, and CH4/N-2 by ZIFs", J. Phys. Chem. C 2010, 114, (18), 8515-8522.
Liu, et al., "Tuning the Adsorption Interactions of Imidazole Derivatives with Specific Metal Cations", J. Phys. Chem. A 2014, 118, (22), 3944-3951.
Lodge, et al., "Materials science—A unique platform for materials design", Science 2008, 321, (5885), 50-51.
Lourenco, et al., "Insights on the Solubility of CO2 in 1-Ethyl-3-methylimidazolium Bis(trifluoromethylsulfonyl)imide from the Microscopic Point of View", Environ. Sci. Technol. 2013, 47, (13), 7421-7429.
Lü, et al., "Triple-Stranded Helical and Plywood-Like Arrays: Two Uncommon Framework Isomers Based on the Common One-Dimensional Chain Structures", Crystal Growth & Design 2006, 6, (8), 1910-1914.
Mason, et al., "Polymer of Intrinsic Microporosity Incorporating Thioamide Functionality: Preparation and Gas Transport Properties", Macromolecules 2011, 44, (16), 6471-6479.
McIntosh, et al., "., Morphology, Modulus, and Conductivity of a Triblock Terpolymer/Ionic Liquid Electrolyte Membrane", Macromolecules 2014, 47, (3), 1090-1098.
Miller, et al., "Design of Functionalized Room-Temperature Ionic Liquid-Based Materials for CO2 Separations and Selective Blocking of Hazardous Chemical Vapors", Sep. Sci. Technol. 2012, 47, (2), 169-177.
Millward, et al., "Metal-Organic Frameworks with Exceptionally High Capacity for Storage of Carbon Dioxide at Room Temperature", J. Am. Chem. Soc. 2005, 127, (51), 17998-17999.
Mukai, et al., "Effect of methyl groups onto imidazolium cation ring on liquid crystallinity and ionic conductivity of amphiphilic ionic liquids", Chem. Lett. 2004, 33, 1630-1631.
Neyertz, et al. "Molecular Dynamics Study of Carbon Dioxide Sorption and Plasticization at the Interface of a Glassy Polymer Membrane", Macromolecules 2013, 46, (6), 2433-2449.

(56) References Cited

OTHER PUBLICATIONS

Neyertz, et al., "Carbon Dioxide Diffusion and Plasticization in Fluorinated Polyimides", Macromolecules 2010, 43, (18), 7813-7827.
Neyertz, et al., "Molecular dynamics simulations of oxygen transport through a fully atomistic polyimide membrane", Macromolecules 2008, 41, (7), 2711-2721.
Neyertz, et al., "Oxygen Sorption in Glassy Polymers Studied at the Molecular Level." Macromolecules 2009, 42, (21), 8521-8533.
Noack, et al., "The role of the C2 position in interionic interactions of imidazolium based ionic liquids: a vibrational and NMR spectroscopic study", Phys. Chem. Chem. Phys. 2010, 12, (42), 14153-14161.
Noble, et al., "Perspective on ionic liquids and ionic liquid membranes", J. Membr. Sci. 2011, 369, (1-2), 1-4.
Pandiyan, et al., "Atomistic Models of Three Fluorinated Polyimides in the Amorphous State", J. Polymer Sci. Part B-Polymer Physics 2009, 47, (12), 1166-1180.
Pez, et al., "Molten salt facilitated transport membranes. Part 1. Separation of oxygen from air at high temperatures", J. Membr. Sci. 1992, 65, (1-2), 21-30.
Robertson, et al., "Alkyl-bis(imidazolium) salts: a new amphiphile platform that forms thermotropic and non-aqueous lyotropic bicontinuous cubic phases", Chem. Commun. 2013, 49, (82), 9407-9409.
Robeson, et al., "Correlation of separation factor versus permeability for polymeric membranes", J. Membr. Sci. 1991, 62, (2), 165-185.
Robeson, et al., "The upper bound revisited", J. Membr. Sci. 2008, 320, (1-2), 390-400.
Rogan, et al., "A highly permeable polyimide with enhanced selectivity for membrane gas separations", J. Mater. Chem. A 2014, 2, (14), 4874-4877.
Rowsell, et al., "Gas Adsorption Sites in a Large-Pore Metal-Organic Framework", Science 2005, 309, (5739), 1350-1354.
Sanders, et al., "Energy-efficient polymeric gas separation membranes for a sustainable future: A review", Polymer 2013, 54, (18), 4729-4761.
Schenkel, et al., "New ionic organic compounds containing a linear tris(imidazolium) core and their thermotropic liquid crystal behavior", Liq. Cryst. 2013, 40, (8), 1067-1081, 1067-1081.
Scovazzo, et al., "Gas separations using non-hexafluorophosphate PF6 (−) anion supported ionic liquid membranes", J. Membr. Sci. 2004, 238, (1-2), 57-63.
Scovazzo, et al., "Regular solution theory and CO2 gas solubility in room-temperature ionic liquids", Ind. Eng. Chem. Res. 2004, 43, (21), 6855-6860.
Scovazzo, et al., "Supported Ionic Liquid Membranes and Facilitated Ionic Liquid Membranes", American Chemical Society 2002, 818, 39-87.
Shamsipur, et al., "Thermally Rearrangeable PIM-Polyimides for Gas Separation Membranes", Macromolecules 2014, 47, (16), 5595-5606.
Shannon, et al., "Chemical and Physical Absorption of SO2 by N-Functionalized Imidazoles: Experimental Results and Molecular-level Insight", Ind. Eng. Chem. Res. 2015, 54, (1), 462-471.
Shannon, et al., "Evaluation of Alkylimidazoles as Physical Solvents for CO2/CH4 Separation", Ind. Eng. Chem. Res. 2012, 51, (1), 515-522.
Shannon, et al., "Free Volume as the Basis of Gas Solubility and Selectivity in Imidazolium-Based Ionic Liquids" *Ind. Eng. Chem. Res.* 2012, 51, (15), 5565-5576.
Shannon, et al., "Properties and Performance of Ether-Functionalized Imidazoles as Physical Solvents for CO2 Separations", Energy Fuels 2013, 27, (6), 3349-3357.
Shannon, et al., "Properties of alkylbenzimidazoles for CO2 and SO2 capture and comparisons to ionic liquids", Sci. China: Chem. 2012, 55, (8), 1638-1647.
Shannon, et al., "Properties of Alkylimidazoles as Solvents for CO2 Capture and Comparisons to Imidazolium-Based Ionic Liquids", Ind. Eng. Chem. Res. 2011, 50, (14), 8665-8677.
Shannon, Matthew S. et al., "Reactive and Reversible Ionic Liquids for CO2 Capture and Acid Gas Removal", Separation Science and Technology, 2012, 47 (2), 178-188.
Simone, et al., "Phase Behavior and Ionic Conductivity of Concentrated Solutions of Polystyrene-Poly(ethylene oxide) Diblock Copolymers in an Ionic Liquid", ACS Appl. Mater. Interfaces 2009, 1, (12), 2812-2820.
Simons, et al., "How do polymerized room-temperature ionic liquid membranes plasticize during high pressure CO2 permeation?" J. Membr. Sci. 2010, 360, (1-2), 202-209.
Sroog, Polym. Sci. 1991, 16, 561-694.
Staudt-Bickel, et al., "Improvement of CO2/CH4 separation characteristics of polyimides by chemical crosslinking", J. Membr. Sci. 1999, 155, (1), 145-154.
Stern, "Polymers for gas separations: the next decade", J. Membr. Sci. 1994, 94, (1), 1-65.
Stern, et al., "Structure/permeability relationships of polyimide membranes: applications to the separation of gas mixtures", J. Polym. Sci., Part B: Polym. Phys. 1989, 27, (9), 1887-909.
Sumida, et al., "Carbon Dioxide Capture in Metal-Organic Frameworks", Chem. Rev. 2012, 112, (2), 724-781.
Swaidan, et al., "Rational Design of Intrinsically Ultramicroporous Polyimides Containing Bridgehead-Substituted Triptycene for Highly Selective and Permeable Gas Separation Membranes", Macromolecules 2014, 47, (15), 5104-5114.
Swaidan, et al., "Role of Intrachain Rigidity in the Plasticization of Intrinsically Microporous Triptycene-Based Polyimide Membranes in Mixed-Gas CO2/CH4 Separations", Macromolecules 2014, 47, (21), 7453-7462.
Tanaka, et al., "Permeability and permselectivity of gases in fluorinated and nonfluorinated polyimides", Polymer 1992, 33, (3), 589-92.
Theodorou, et al., "Hierarchical modelling of polymeric materials", Chem. Eng. Sci. 2007, 62, (21), 5697-5714.
Tiwari, et al., "Gas permeation in thin films of "high free-volume" glassy perfluoropolymers: Part I. Physical aging", Polymer 2014, 55, (22), 5788-5800.
Turner, et al., "Turner, C. H.; et al., Molecular Simulation of the Thermophysical Properties of N-Functionalized Alkylimidazoles.", J. Phys. Chem. B 2012, 116, 6529-6535.
Voss, et al., "Physically Gelled Ionic Liquids: Solid Membrane Materials with Liquidlike CO2 Gas Transport", Chemistry of Materials 2009, 21, (14), 3027-3029.
Wasserscheid and Keim, Angew Chem Int Ed Engl, 2000, 39:3772.
Wen, "1D helix, 2D brick-wall and herringbone, and 3D interpenetration d(10) metal-organic framework structures assembled from pyridine-2,6-dicarboxylic acid N-oxide", Inorg. Chem. 2005, 44, (20), 7161-7170.
Whitley, et al., "Enhanced photopolymerization rate & conversion of 1-vinylimidazole in the presence of lithium bistriflimide", Eur. Polymer J. 2014, 60, (0), 92-97.
Wickramanayake, et al., "Investigation of transport and mechanical properties of hollow fiber membranes containing ionic liquids for pre-combustion carbon dioxide capture", J. Membr. Sci. 2013, 439, 58-67.
Wiesenauer, et al., "Imidazolium-containing, hydrophobic-ionic-hydrophilic ABC triblock copolymers: synthesis, ordered phase-separation, and supported membrane fabrication", Soft Matter 2013, 9, (33), 7923-7927.
Wind, et al., "Natural gas permeation in polyimide membranes", J. Membr. Sci. 2004, 228, (2), 227-236.
Winterton, et al., "Solubilization of polymers by ionic liquids", J. Mater. Chem. 2006, 16, (44), 4281-4293.
Xiao, et al., "The strategies of molecular architecture and modification of polyimide-based membranes for CO2 removal from natural gas—A review", Progress in Polymer Science 2009, 34, (6), 561-580.
Yazaki, et al., "Nanostructured Liquid Crystals Combining Ionic and Electronic Functions", J. Am. Chem. Soc. 2010, 132, (22), 7702-7708.

(56) References Cited

OTHER PUBLICATIONS

Yazaydin, et al., "Screening of Metal-Organic Frameworks for Carbon Dioxide Capture from Flue Gas Using a Combined Experimental and Modeling Approach", J. Am. Chem. Soc. 2009, 131, (51), 18198-18199.

Yoshio, et al., "Liquid-crystalline assemblies containing ionic liquids: an approach to anisotropic ionic materials", Chem. Lett. 2002, 3, 320-321.

Zhang, et al., "The effect of C2 substitution on melting point and liquid phase dynamics of imidazolium based-ionic liquids: insights from molecular dynamics simulations", Phys. Chem. Chem. Phys. 2012, 14, (35), 12157-12164.

\* cited by examiner

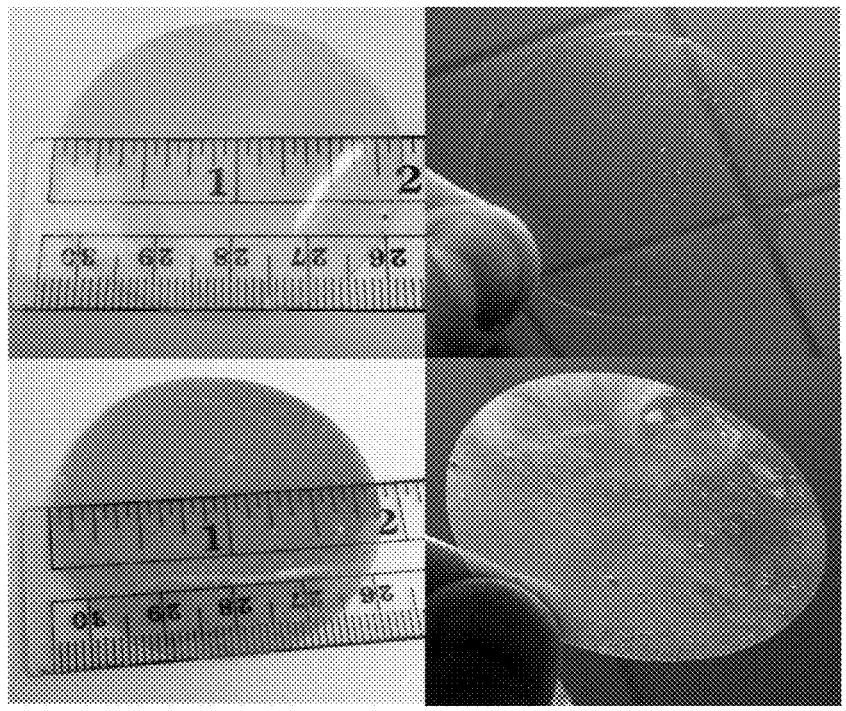

IONIC POLYIMIDE MATERIALS AND METHODS OF USE

CROSS REFERENCE TO RELATED APPLICATIONS

This application claims the benefit of priority to U.S. Provisional Application 62/098,068, filed Dec. 30, 2014, which is incorporated by reference herein in its entirety.

STATEMENT REGARDING FEDERALLY SPONSORED RESEARCH

This invention was made with government support under grant number CBET-1159397 awarded by the National Science Foundation. The government has certain rights in the invention.

FIELD

The subject matter disclosed herein generally relates to ionic polyimides, methods for the synthesis of ionic polyimides, and uses of compositions of ionic polyimides, e.g., to capture carbon dioxide.

BACKGROUND

Based on the growing concerns of the impact of rising levels of greenhouse gases (GHGs), there has been a great emphasis on developing strategies to capture carbon dioxide to help curb emissions. Current technology uses aqueous amines, such as monoethanolamine (MEA), to capture carbon dioxide ($CO_2$). However, aqueous amines can suffer from many deficiencies including amine degradation and solvent evaporation. Carbon dioxide ($CO_2$) can also be captured by a number of other methods, including using ionic liquids. Methods have been previously developed to separate $CO_2$ from air utilizing ionic liquids based on the high dissolution rate of $CO_2$ into ionic liquids. The ionic liquid can also serve as an excellent solvent environment for amines. Additionally, methods have been developed to design ionic liquids to chemically bond with $CO_2$ by tethering amines to one of the ionic components of an ionic liquid (see Bara et al., *Acc. Chem. Res.* 43 (2010) 152-159). While these materials and methods show great promise in certain applications, they can be limited in other applications, e.g., when high temperatures and/or reactive chemicals are involved. Thus what are needed are new materials than can be used to capture carbon dioxide under high temperature or other specialized conditions. The materials and methods disclosed herein address these and other needs.

SUMMARY

The present disclosure generally relates to ionic polyimides and methods for the synthesis of ionic polyimides. In some aspects, the disclosed synthetic methods can comprise a designable approach, which can allow for a greater degree of control of the structure of the ionic polyimide. In some aspects, a dianhydride can be reacted with an amine attached to an ionizable heteroaryl. The heteroaryl can then be ionized through an alkylation reaction with a molecule comprising at least two leaving groups, which can generate a polymer.

In some aspects, a dianhydride can be reacted with an amine attached to a leaving group. The leaving group can then be reacted with an ionizable heteroaryl. The ionizable heteroaryl can then be ionized through an alkylation reaction with a molecule comprising at least two leaving groups, which can generate a polymer.

Also, disclosed herein are compositions comprising an ionic polyimide. Also disclosed herein are compositions comprising an ionic polyimide and an ionic liquid. The disclosed compositions can be utilized to capture gases and methods involving such uses are disclosed herein.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions, as claimed.

BRIEF DESCRIPTION OF THE FIGURE

The accompanying FIGURE, which is incorporated in and constitutes a part of this specification, illustrates several aspects described below.

FIG. 1 contains photographs of ionic polyimide films neat (left, top) and with ~25 wt % "free" ionic liquid (IL) [$C_2$mim][$Tf_2N$] content (left, bottom). The difference in optical clarity when "free" IL is present illustrated by the pictures on right (top: without IL) and (bottom: with IL present).

DETAILED DESCRIPTION

Provided herein are methods for synthesizing ionic polyimides, which can be designable in structure and function. Incorporating an ionic functionality can improve $CO_2$ absorption. Additionally, incorporating ionic functionality can allow for a tunable structure, chemical properties, and physical properties of the resulting ionic polyimide polymer. The disclosed methods of synthesizing an ionic polyimide can allow for the synthesis of new structures of polyimides. Ionic polyimides prepared by these methods, and compositions comprising such ionic polyimides (e.g., with ionic liquids) are also disclosed.

The materials, compounds, compositions, articles, and methods described herein can be understood more readily by reference to the following detailed description of specific aspects of the disclosed subject matter and the Examples and Figures included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an ionic liquid" includes mixtures of two or more such ionic liquids, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., Zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation acetylation, esterification, de-esterification, hydrolysis, etc.

The term "anion" is a type of ion and is included within the meaning of the term "ion." An "anion" is any molecule, portion of a molecule (e.g., Zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., Zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. In specific examples, when a moiety is indicated as being substituted herein, it can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

"$A^1$," "$A^2$," and "$A^3$," are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like.

When "alkyl" is used in one instance and a specific term such as "alkyl alcohol" is used in another, it is not meant to imply that the term "alkyl" does not also refer to specific terms such as "alkyl alcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, triptycene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl or heteroaryl group can be substituted or unsubstituted. The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" is a short hand notation for C=O.

The terms "amine" or "amino" as used herein are represented by the formula $NA^1A^2A^3$, where $A^1$, $A^2$, and $A^3$ can be, independently, hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" as used herein is represented by the formula —C(O)O⁻.

The term "ester" as used herein is represented by the formula —OC(O)$A^1$ or —C(O)O$A^1$, where $A^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $A^1C(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" as used herein refers to the halogens fluorine, chlorine, bromine, and iodine.

The term "hydroxyl" as used herein is represented by the formula —OH.

The term "nitro" as used herein is represented by the formula —NO₂.

The term "silyl" as used herein is represented by the formula —Si$A^1A^2A^3$, where $A^1$, $A^2$, and $A^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "anhydride" as used herein is represented by the formula -A$^1$-C(O)OC(O)-A$^2$, where A$^1$ and A$^2$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

"A$^1$," "A$^2$," "A$^3$," "A$^n$," etc., where n is some integer, as used herein can, independently, possess one or more of the groups listed above. For example, if A$^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As used herein, substantially pure means sufficiently homogeneous to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gas-chromatography mass spectrometry (GC-MS), and similar, used by those of skill in the art to assess such purity, or sufficiently pure such that further purification would not detectably alter the physical and chemical properties, such as enzymatic and biological activities, of the subs Materials and Compositions Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), Sigma (St. Louis, Mo.), or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989). Other materials, such as the ligands, disclosed herein can be obtained from commercial sources.

Ionic Polyimides

One class of polymers that has been utilized previously for its high thermal stability and low chemical reactivity is polyimides. Polyimides are polymers comprising repeating imide monomers. The primary method for the synthesis of polyimides has been through a two-step reaction between dianhydrides and diamines as seen in Scheme 1, which represents a condensation reaction. (See Scroog, *Prog. Polym. Sci.* 16 (1991) 561-694.)

Scheme 1. Synthesis of polyimides through a two-step method utilizing a diamine and dianhydride.

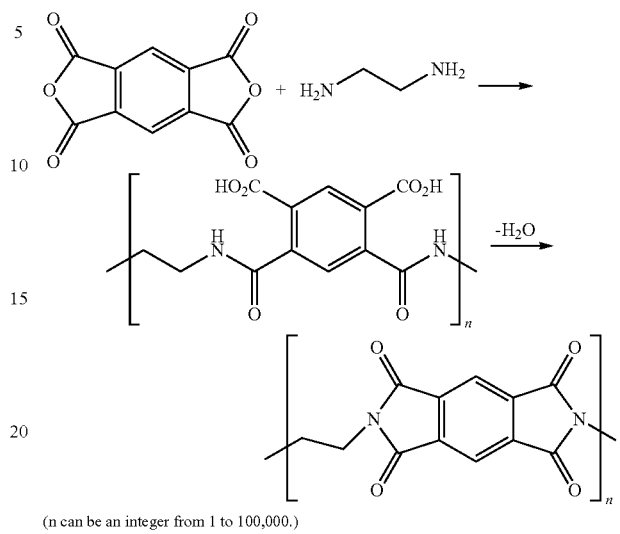

(n can be an integer from 1 to 100,000.)

One challenge with polyimide design is that it is limited to the design of either one of the two starting components: the dianhydride or the diamine. Thus, only the molecular structure between the two amine functional groups or between the two anhydride functional groups can be altered to change the properties of the polyimide.

Disclosed herein are methods to design a greater range of polyimides that can be utilized for carbon capture, in high temperature applications, and as lubricants, among other uses. By incorporating ionic functionality, an additional level of structural and spatial control can be implemented to potentially improve $CO_2$ capture, the mechanical properties, or the chemical properties of the polyimides.

Polyimides can be desirable for gas separation membranes due their high gas permeability, intrinsic selectivity and potentially desirable physical properties. Polyimides such as MATRIMID™ and KAPTON™ were developed for use in microelectronics and as thermal insulators. Wholly aromatic polyimides such as these can be synthesized via an initial condensation of a diamine with a dianhydride at near ambient temperature, followed by thermal imidization at higher temperature. MATRIMID™ and UPILEX™ can be useful for gas separations in commercial gas separation applications (e.g. $H_2/CH_4$, $CO_2/CH_4$, $O_2/N_2$, etc.) based on their ability to be processed into high quality films and fibers, even though their $CO_2$ permeabilities tend to be less than 20 Barrer, and well below Robeson's Upper Bounds.

Recent developments in polyimide design have revolved around the use of the fluorinated dianhydride, 6-FDA, with bulky aromatic diamines. These materials have can have higher $CO_2$ permeabilities (500-700 Barrer) due to the large disruptions in chain packing (and increased FFV) caused by —$CF_3$ groups and multiple —$CH_3$ groups present on aromatic diamines such as durene diamine. The inclusion of very bulky triptycene linkages within the polyimide backbone can increase the performance of polyimides with $CO_2$ permeabilities approaching 3000 Barrers having been reported very recently (see Swaidan et al., *Macomolecules* 47 (2014) 5104-14).

Although seemingly two disparate classes of materials, ionic liquids (ILs) and rigid polyimides are integrated herein, resulting in so called ionic polyimides. Furthermore, the ionic polyimides can be more than the sum of their parts—rigid ionic polyimides can form unique, ordered nanostructures that are not present in either of the parent materials.

In specific aspects, disclosed herein are ionic polyimides and compositions thereof. In some examples the ionic polyimides can be represented by Formula I:

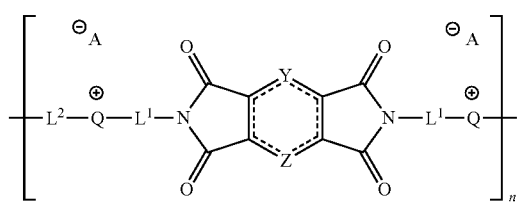

wherein each dotted line represents an optional bond;

Y is null, H, halogen, OH, CH, $CH_2$, C(O), O, S, $SO_2$, N, NH, $NH_2$, $NHR^{11}$, CN, $CR^{11}$, $CHR^{11}$, $CR^{11}{}_2$, $OR^{11}$, $C(CF_3)_2$;

Z is CH, $CH_2$, C(O), O, S, $SO_2$, N, NH, $NH_2$, $NHR^{11}$, CN, $CR^{11}$, $CHR^{11}$, $CR^{11}{}_2$, $OR^{11}$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

each $R^{11}$ is, independent of any other, H, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^1$ is null, $CH_2$, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^2$ is null, $CH_2$, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, substituted or unsubstituted morpholininium, or mixtures thereof, wherein any of the substituted groups named can be substituted with one or more alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl) trifluorophosphatemesylate, aluminum chloride, thiocyanide, mesylate, triflate, or tosylate.

n is an integer between 1 and 100,000. In certain examples, Z is substituted or unsubstituted triptycene.

In specific examples of Formula I, $L^1$ is a branched or straight chain $C_1$-$C_{10}$ alkyl. In other specific examples of Formula I, Q is unsubstituted or substituted imidazolium. In other examples of Formula I, $L^2$ is an unsubstituted or substituted aryl, branched or straight chain $C_1$-$C_{10}$ alkyl, or $C_1$-$C_{10}$ heteroalkyl.

The ionic polyimides disclosed herein can be divided into subclasses of compounds based on the atoms between the two imide functional groups. One subclass of ionic polyimides can be represented by Formula II-A:

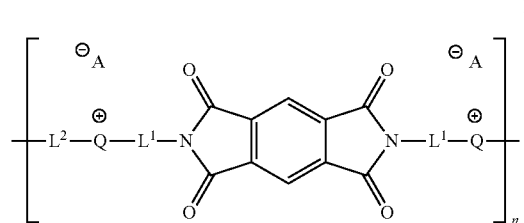

wherein L¹ is null, CH₂, C(O), O, S, SO₂, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

L² is null, CH₂, C(O), O, S, SO₂, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, substituted or unsubstituted morpholininium, or mixtures thereof, wherein any of the substituted groups named can be substituted with one or more alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

n is an integer between 1 and 100,000.

In some examples, Q can be an unsubstituted or substituted imidazolium functional group, which can be represented by Formula II-A-1:

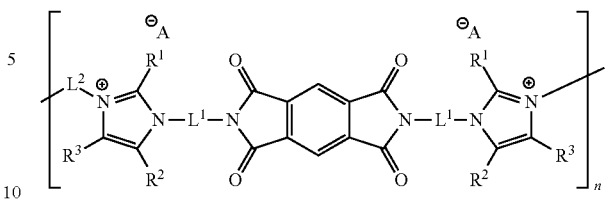

wherein L¹ is null, CH₂, C(O), O, S, SO₂, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

L² is null, CH₂, C(O), O, S, SO₂, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

R¹, R², and R³ are, independent of any other, H, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

n is an integer from 1 to 100,000.

In some examples L¹ can be an unsubstituted or substituted phenyl functional group, which can be represented by Formula II-A-2:

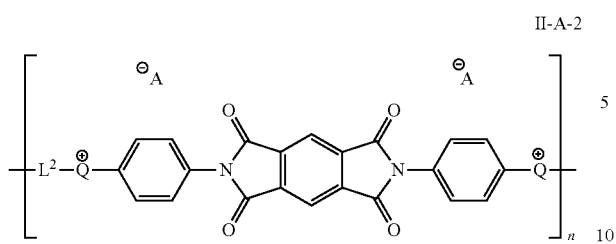

wherein L² is null, CH₂, C(O), O, S, SO₂, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, substituted or unsubstituted morpholininium, or mixtures thereof, wherein any of the substituted groups named can be substituted with one or more alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl) trifluorophosphatemesylate, aluminum chloride, thiocyanide, mesylate, triflate, or tosylate.

n is an integer from 1 to 100,000.

In some examples, Q can be an unsubstituted or substituted imidazolium functional group, L¹ can be propyl, and L² can be derived from 1,4-dichlorodurene, which can be represented by Formula II-B:

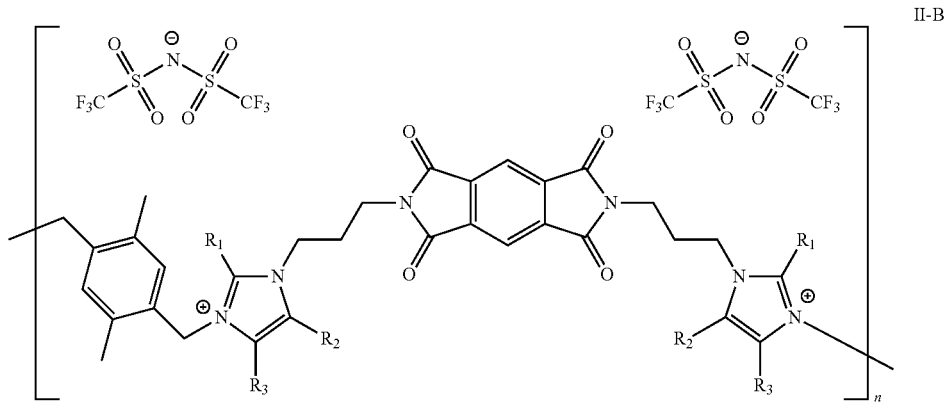

wherein R¹, R², and R³ are, independent of any other, H, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl) trifluorophosphatemesylate, aluminum chloride, thiocyanide, mesylate, triflate, or tosylate.

n is an integer from 1 to 100,000.

In some examples, Q can be an unsubstituted or substituted imidazolium functional group, L¹ can be propyl, L² can be derived from 1,4-dichlorodurene, R¹ can be methyl, R² can be methyl, R³ can be methyl, and A can be bis(trifluoromethane)sulfonamide, which can be represented by Formula II-C:

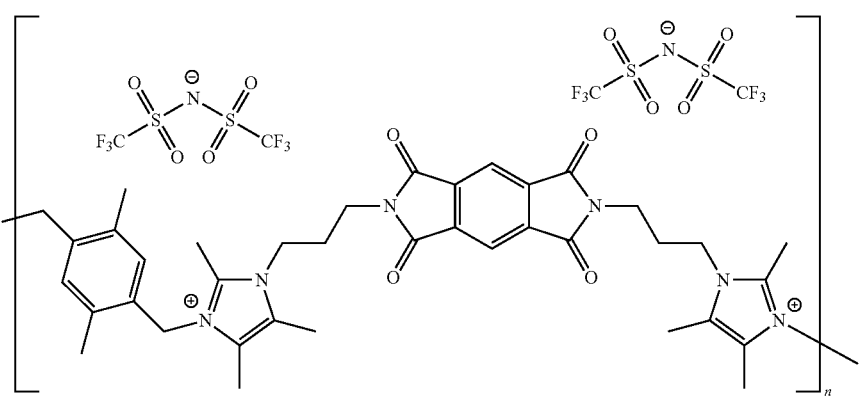

wherein n is an integer from 1 to 100,000.

One subclass of ionic polyimides can be represented by Formula III, wherein a functional group, B, bridges two phenyl functional groups:

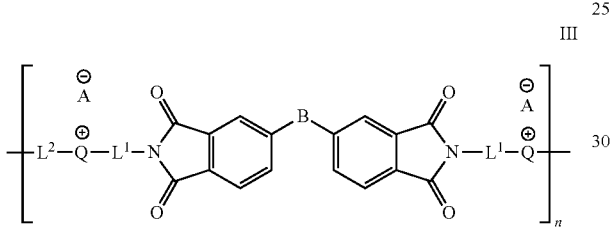

wherein B is halogen, OH, CH, $CH_2$, C(O), O, S, $SO_2$, N, NH, $NH_2$, $NHR^{11}$, CN, $CR^{11}$, $CHR^{11}$, $CR^{11}2$, $OR^{11}$, or $C(CF_3)_2$;

each $R^{11}$ is, independent of any other, H, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^1$ is null, $CH_2$, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^2$ is null, $CH_2$, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, substituted or unsubstituted morpholininium, or mixtures thereof, wherein any of the substituted groups named can be substituted with one or more alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl) trifluorophosphatemesylate, aluminum chloride, thiocyanide, mesylate, triflate, or tosylate.

n is an integer between 1 and 100,000.

In some examples, Q can be an unsubstituted or substituted imidazolium functional group, which can be represented by Formula III-A:

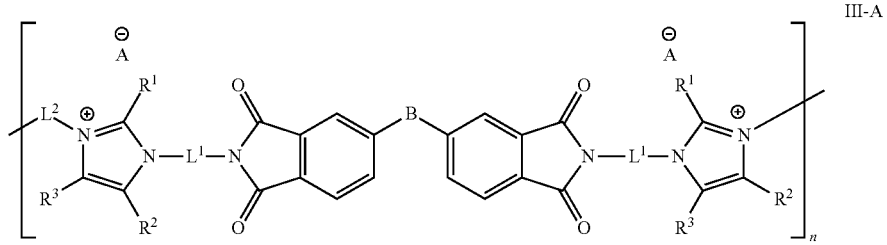

wherein B is halogen, OH, CH, $CH_2$, C(O), O, S, $SO_2$, N, NH, $NH_2$, $NHR^{11}$, CN, $CR^{11}$, $CHR^{11}$, $CR^{11}_2$, $OR^{11}$, or $C(CF_3)_2$;

each $R^{11}$ is, independent of any other, H, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

each $R^1$, $R^2$, and $R^3$ is, independent of any other, H, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^1$ is null, $CH_2$, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

$L^2$ is null, $CH_2$, C(O), O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl) trifluorophosphatemesylate, aluminum chloride, thiocyanide, mesylate, triflate, or tosylate.

n is an integer between 1 and 100,000.

In some examples, Q can be an unsubstituted or substituted imidazolium functional group, $L^1$ can be propyl, and $L^2$ can be derived from 1,4-dichlorodurene, which can be represented by Formula III-B:

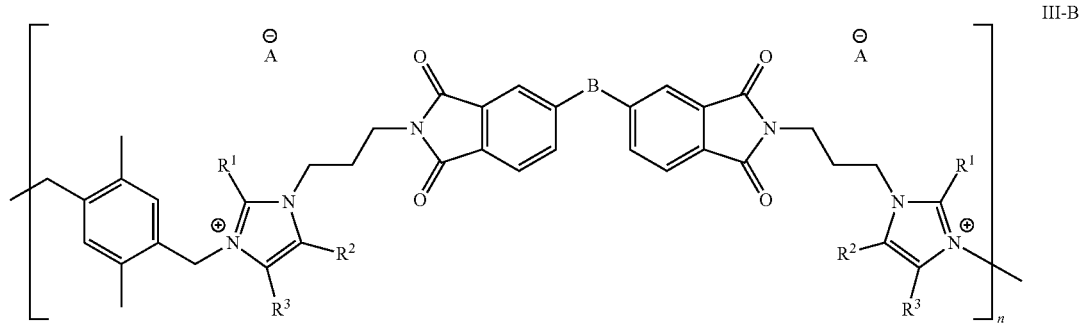

wherein B is halogen, OH, CH, CH$_2$, C(O), O, S, SO$_2$, N, NH, NH$_2$, NHR$^{11}$, CN, C R$^{11}$, CHR$^{11}$, CR$^{11}$2, OR$^{11}$, or C(CF$_3$)$_2$;

each R$^{11}$ is, independent of any other, H, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

each R$^1$, R$^2$, and R$^3$ are, independent of any other, H, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and A is chloride, bromide, iodide, nitrate, dicyanamide, acetate, bis(trifluoromethane)sulfonamide, hexafluorophosphate, tetrafluoroborate, sulfate, phosphate, tris(perfluoroalkyl) trifluorophosphatemesylate, aluminum chloride, thiocyanide, mesylate, triflate, or tosylate.

n is an integer from 1 to 100,000.

In some examples, Q can be an unsubstituted or substituted imidazolium functional group, L$^1$ can be propyl, L$^2$ can be derived from 1,4-dichlorodurene, R$^1$ can be methyl, R$^2$ can be methyl, R$^3$ can be methyl, and A can be bis(trifluoromethane)sulfonamide, which can be represented by Formula III-C:

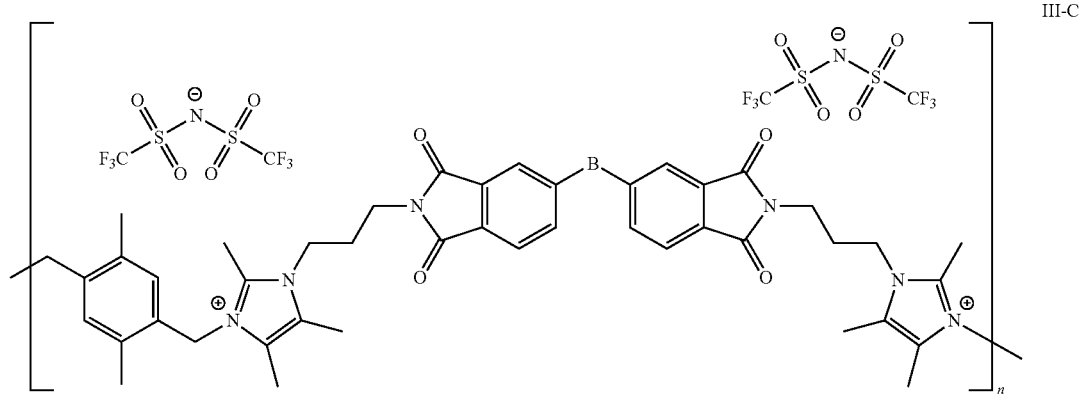

III-C wherein B is halogen, OH, CH, CH$_2$, C(O), O, S, SO$_2$, N, NH, NH$_2$, NHR$^{11}$, CN, CR$^{11}$, CHR$^{11}$, CR$^{iii}$2, OR$^{11}$, or C(CF$_3$)$_2$;

each R$^{11}$ is, independent of any other, H, substituted or unsubstituted C$_{1-20}$ alkyl, substituted or unsubstituted C$_{2-20}$ alkenyl, substituted or unsubstituted C$_{2-20}$ alkynyl, substituted or unsubstituted C$_{1-20}$ heteroalkyl, substituted or unsubstituted C$_{2-20}$ heteroalkenyl, substituted or unsubstituted C$_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and n is an integer from 1 to 100,000.

In some examples, Q can be an unsubstituted or substituted imidazolium functional group, L$^1$ can be propyl, L$^2$ can be derived from 1,4-dichlorodurene, R$^1$ can be methyl, R$^2$ can be methyl, R$^3$ can be methyl, A can be bis(trifluoromethane)sulfonamide and B can be —C(CF$_3$)$_2$, which can be represented by Formula III-D:

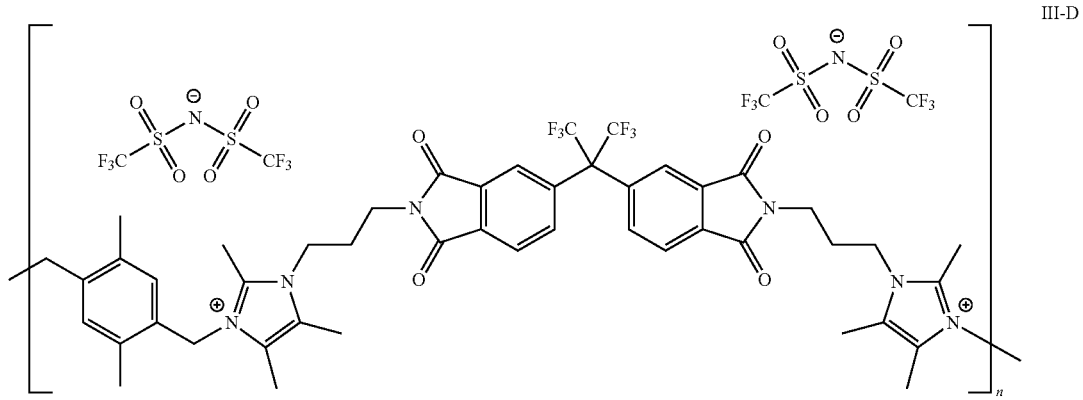

III-D wherein n is an integer from 1 to 100,000.

Synthesis of an Ionic Polyimide

Also, disclosed herein are methods for synthesizing an ionic polyimide comprising an ionized heteroaryl. The methods disclosed herein comprise at least four components: (1) a dianhydride, (2) an amine tethered to an ionizable heteroaryl, (3) an alkylating agent, and (4) an anion. In some aspects, the disclosed method can generate an ionic polyimide by reacting the amine tethered to an ionizable heteroaryl to generate a bridging monomer. (See Scheme 10.) The bridging monomer can be reacted with an alkylating reagent to generate a repeating pattern. The anion can be optionally exchanged.

Dianhydride

A dianhydride can be utilized to generate an ionic polyimide. A dianhydride molecule comprises two anhydride functional groups. The molecular structure between the two anhydride functional groups can be altered to adjust the resulting ionic polyimide's properties, such as thermal stability, chemical reactivity, viscosity, and melting point, among other chemical and physical properties. For example, incorporating an aryl functional group into the dianhydride functional group can lead to greater thermal stability based on the stacking of the pi systems as a polymer.

Some suitable examples of dianhydrides include, but are not limited to, Benzoquinonetetracarboxylic dianhydride (BQDA), Ethylenetetracarboxylic dianhydride (EDA), Naphthalenetetracarboxylic dianhydride (NDA), Pyromellitic dianhydride (PMDA), Dioxane tetraketone (DTK), 3,3',4,4'-Diphenylsulfone tetracarboxylic dianhydride (DSDA), 3,3',4,4'-Benzophenone tetracarboxylic dianhydride (BTDA), 3,3',4,4'-Biphenyl tetracarboxylic dianhydride (s-BPDA), 2,2'-Bis-(3,4-Dicarboxyphenyl) hexafluoropropane dianhydride (6-FDA), 4,4'-Oxydiphthalic dianhydride (ODPA), 4,4', Bisphenol A dianhydride (BPADA), Hydroquinone diphthalic anhydride (HQDEA), TRIPDA, and PIMDA. Some of these examples are illustrated in Scheme 2. Although some examples of the dianhydride component are given in Scheme 2, any dianhydride can be selected.

In some other examples, suitable dianhydrides that can be used in the disclosed methods are represented by Formula IV:

IV wherein each dotted line represents an optional bond;

Y is null, H, halogen, OH, CH, $CH_2$, C(O), O, S, $SO_2$, N, NH, $NH_2$, $NHR^{11}$, CN, $CR^{11}$, $CHR^{11}$, $CR^{11}2$, $OR^{11}$, $C(CF_3)_2$;

Z is CH, $CH_2$, C(O), O, S, $SO_2$, N, NH, $NH_2$, $NHR^{11}$, CN, $CR^{11}$, $CHR^{11}$, $CR^{11}2$, $OR^{11}$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, substituted or unsubstituted triptycene, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

each $R^{11}$ is, independent of any other, H, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

In some examples, suitable dianhydrides that can be used in the disclosed methods can be connected to a substituted or unsubstituted triptycene moiety, wherein each anhydride functional group is attached to a phenyl functional group in the triptycene moiety.

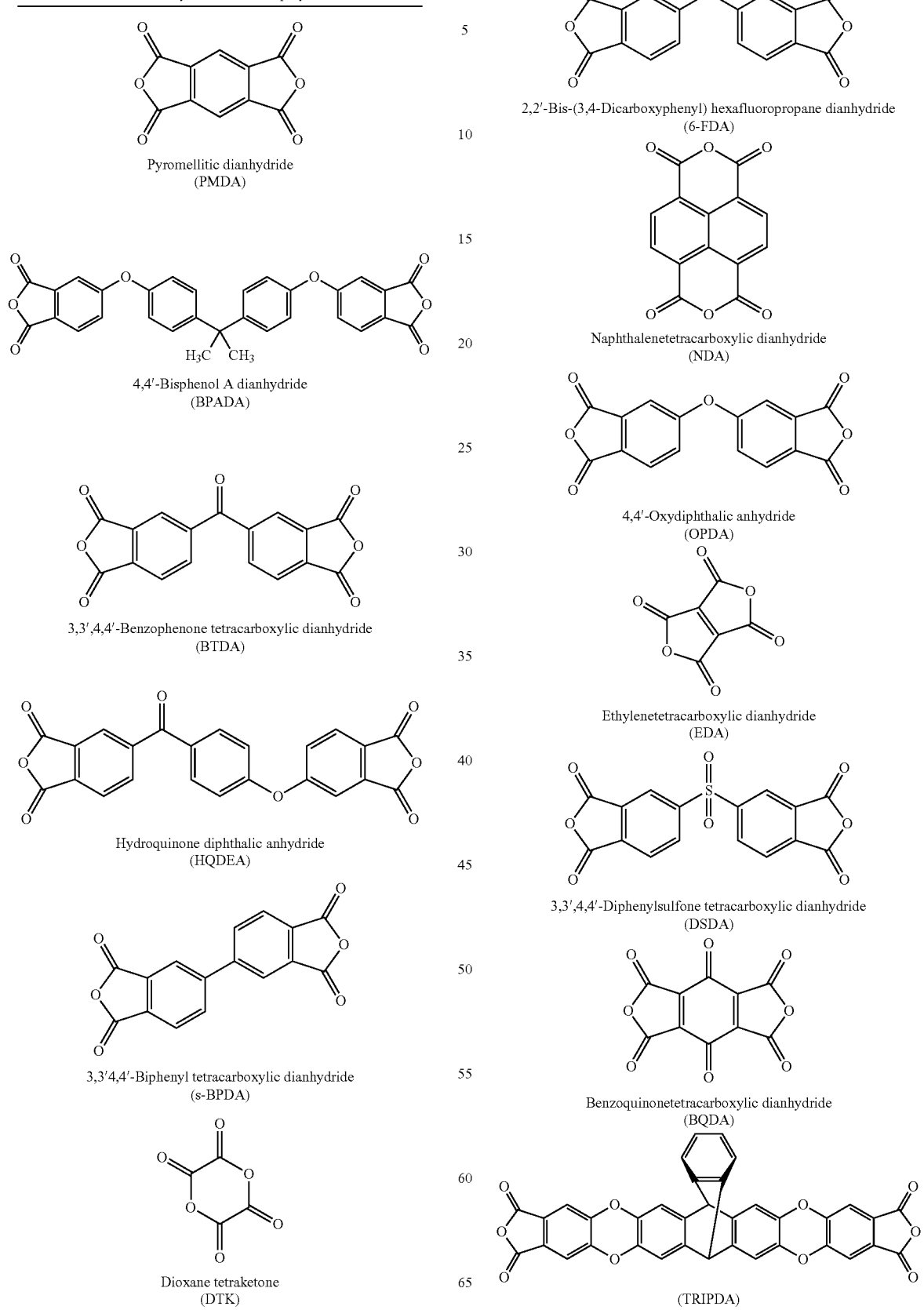

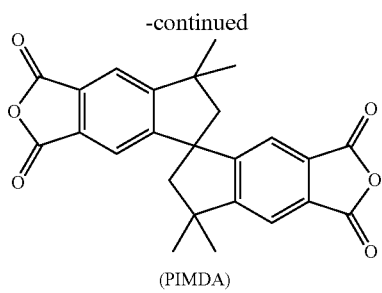

(PIMDA)

Amine

The disclosed methods also use a monoamine. In previous synthetic strategies, a diamine has been utilized. However, the reaction between a diamine and a dianhydride can cause polymerization. Instead, if a molecule with a single amine functional group is used, polymerization is disfavored. A reaction between two molecules that comprise a monoamine and a dianhydride results in a monomer containing two imide functional groups. (See Scheme 10.) This monomer can act as a "bridge" between the ionized groups.

Attached to the monoamine is a functional group that is capable of ionizing. One such class of compounds that can be ionized are heteroaryls. If the amine functional group is tethered to a heteroaryl, it provides a molecule that can generate an imide monomer while still having the capability to be ionized. (See Scheme 3.)

In some examples, suitable amines that can be used in the disclosed methods are represented by Formula V:

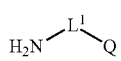

V wherein $L^1$ is null, $CH_2$, $C(O)$, $O$, $S$, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups;

Q is substituted or unsubstituted pyrazoles, substituted or unsubstituted pyridines, substituted or unsubstituted pyrazines, substituted or unsubstituted pyrimidines, substituted or unsubstituted pryidazines, substituted or unsubstituted piperidines, substituted or unsubstituted pyrrolidines, substituted or unsubstituted indolizines, substituted or unsubstituted isoindoles, substituted or unsubstituted indoles, substituted or unsubstituted indazoles, substituted or unsubstituted imidazoles, substituted or unsubstituted oxazoles, substituted or unsubstituted triazoles, substituted or unsubstituted tetrazoles, substituted or unsubstituted thiazoles, substituted or unsubstituted purines, substituted or unsubstituted isoquinolines, substituted or unsubstituted quinolines, substituted or unsubstituted phthalazines, substituted or unsubstituted quinooxalines, substituted or unsubstituted phenazines, substituted or unsubstituted morpholinines, or mixtures thereof, wherein any of the substituted groups named can be substituted with one or more alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

In some specific examples, $L^1$ is a polyether, polyester, or polyamide of from 1-100 atoms in length.

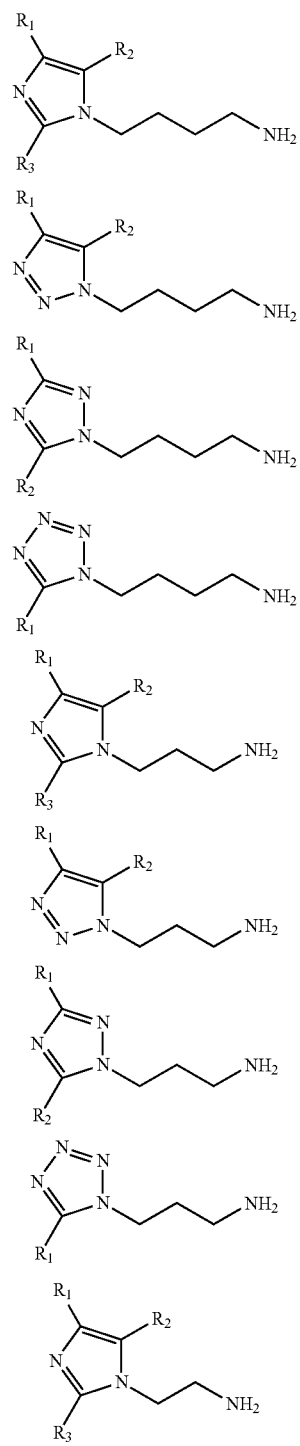

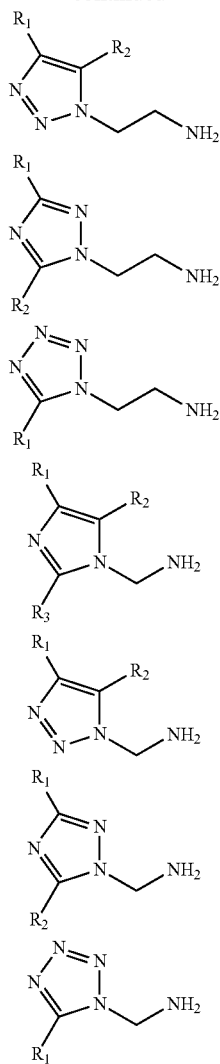

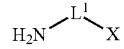

Wherein $L^1$ is null, $CH_2$, $C(O)$, O, S, $SO_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and X is Cl, Br, I, O, O-Ph-$SO_3CH_3$, $SO_3CH_3$, or $SO_3CH_3$.

The leaving group, X can then react with an ionizable heteroaryl, Q, to form the bridging monomer, wherein Q is substituted or unsubstituted pyrazoles, substituted or unsubstituted pyridines, substituted or unsubstituted pyrazines, substituted or unsubstituted pyrimidines, substituted or unsubstituted pryidazines, substituted or unsubstituted piperidines, substituted or unsubstituted pyrrolidines, substituted or unsubstituted indolizines, substituted or unsubstituted isoindoles, substituted or unsubstituted indoles, substituted or unsubstituted indazoles, substituted or unsubstituted imidazoles, substituted or unsubstituted oxazoles, substituted or unsubstituted triazoles, substituted or unsubstituted tetrazoles, substituted or unsubstituted thiazoles, substituted or unsubstituted purines, substituted or unsubstituted isoquinolines, substituted or unsubstituted quinolines, substituted or unsubstituted phthalazines, substituted or unsubstituted quinooxalines, substituted or unsubstituted phenazines, substituted or unsubstituted morpholinines, or mixtures thereof, wherein any of the substituted groups named can be substituted with one or more alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

Alkylating Agent

If the alkylating agent is capable of two alkyation reactions, the alkylating agent can serve to connect the bridging monomers into dimers, trimers, and ultimately a polymer. The growth of the polymer can result from such a reaction as disclosed herein.

In some examples, suitable alkylating agents that can be used in the disclosed methods are represented by Formula VII:

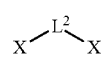

wherein $L^2$ is substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted $C_{2-20}$ heteroalkynyl, substituted or unsubstituted cycloalkyl, substituted or unsubstituted heterocycloalkyl, substituted or unsubstituted aryl, substituted or unsubstituted heteroaryl, or Some suitable classes of monoamines are shown in Scheme 3. The monoamine can be attached to a variety of heteroaryls, such as but not limited to, azoles, imidazoles, 1,2,3-triazoles, 1,2,4-triazoles, tetrazoles, pyridines, piperidines, pyrrolidines, and pyrazoles. The heteroaryls can be substituted with one or more functional groups, such as alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups.

The amine group can be directly attached to the heteroaryl or attached by a bridge. The bridge can be attached to a heteroatom or any one of the carbon atoms on the heteroaryl. The resulting reaction between the monoamine and the dianhydride can generate a bridging monomer, which can be polymerized through a reaction with an alkylating agent.

Two-Step Synthesis of Bridging Monomer

In some embodiments, an amine attached to a leaving group can react with a dianhydride to form an imide (Scheme 7). In some examples, suitable amines attached to a leaving group that can be used in the disclosed methods are represented by Formula VI:

mixtures thereof, wherein any of the substituted groups named can be substituted with one or more of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol groups; and X is Cl, Br, I, O, O-Ph-SO$_3$CH$_3$, SO$_3$CH$_3$, or SO$_3$CH$_3$.

Possible examples of suitable alkylating agents are show in Scheme 4. In some aspects, the alkylating agent comprises at least two leaving groups. Some leaving groups include, but are not limited to, chlorine, bromine, iodine, methanesulfonyl(mesylate), trifluoromethanesulfonyl(triflate), or p-toluenesuifonyl(tosylate). A substitution reaction can take place between the alkylating agent and the ionizable heteroaryl as described above. This substitution reaction can result in the heteroaryl reacting with the carbon atom directly next to one of the leaving groups, which can result in a cationic heteroaryl and the leaving group as an anion. The reaction between the alkylating agent and the bridging monomer can generate an ionic polyimide. (See Scheme 10.)

Scheme 4. Some non-limiting examples of alkylating agents that can be utilized in the synthesis of ionic polyimides. X represents a leaving group

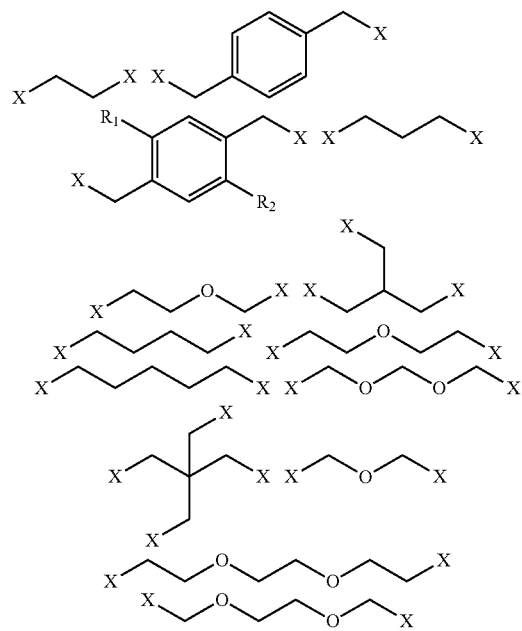

A suitable bridge can connect the two leaving groups. The bridge can be selected based on its impact on chemical or physical properties of the resulting polymer. The bridge can comprise alkyl, alkenyl, alkynyl, aryl, ether, or ester functionality. Some examples of suitable bridges can be seen in Scheme 4.

Anions

The leaving groups can be used as an anion for the cationic monomer as a byproduct of the reaction between the alkylating agent and the bridging monomer. In some aspects, the anion can be exchanged for another anion that can be improve properties, such as viscosity, CO$_2$ affinity, or melting point. The anion can be exchanged by methods known to a person skilled in the art.

Some suitable anions that can be utilized can be seen in Scheme 5. In some aspects the anion can be chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

Scheme 5. Some possible anions that can be used in the synthesis of ionic polyimides

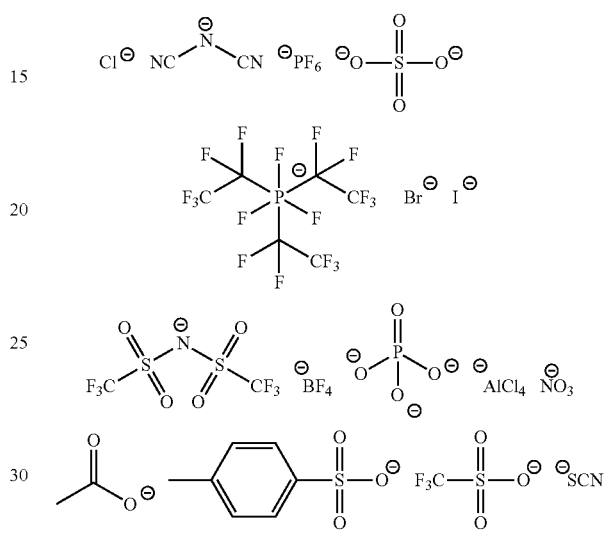

Synthesis of Ionic Polyimide

The disclosed methods for synthesizing an ionic polyimide can be illustrated by Scheme 10. The ionic polyimide can be synthesized by the condensation reaction between a dianhydride (e.g., those shown in Scheme 2) and a suitable monoamine (e.g., those shown in Scheme 3). The reaction can be performed neat or in a solvent. The reaction can be optionally heated. After an optional removal of the solvent, the resulting molecule can be a bridging monomer comprising two imide functional groups and two ionizable heteroaryls. An alkylating agent with at least two leaving groups (Scheme 4) can connect two monomers of the bridging monomer through a substitution reaction. This reaction can create a positively charged dimer, trimer, or polymer paired with a suitable anion (Scheme 5). This can represent a step-growth polymerization method.

Condensation Reaction to Form a Monomeric Imide

The ionic polyimide can be synthesized by a condensation reaction between a dianhydride (Scheme 2) and a suitable amine (Scheme 3). As shown in Scheme 6, the dianhydride can be mixed with two molar equivalents of the amine attached to a heteroaryl in a suitable solvent. The amine functional group can react with the anhydride functional group to form an imide functional group and a molecule of water, which can be removed with the solvent. The resulting product is a bridging monomer. In previously developed methods (Scheme 1), utilizing a diamine, a polymer can be synthesized. However, disclosed herein is a method to synthesize a bridging monomer, which can allow for greater structure control before the step growth mechanism to synthesize a polymer.

Scheme 6. Examples of condensation reaction to synthesize a bridging monomer

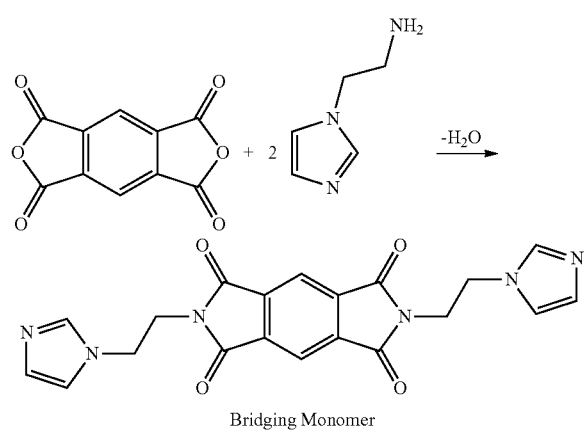

Some suitable solvents include, but are not limited to water, dichloromethane, chloroform, ethyl acetate, tetrahydrofuran, acetone, acetonitrile, N,N-dimethylformamide, or dimethyl sulfoxide. The reaction can also be optionally heated up to 150° C.

The reaction mixture can be stirred and heated for up to 48 hours to generate the bridging monomer. After the removal the solvent and generated water, the bridging monomer can be isolated.

The monomeric imide, or bridging monomer, can also be synthesized by a multi-step reaction. As seen in Scheme 7, the dianhydride can be mixed with two molar equivalents of the amine attached to a leaving group in a suitable solvent. The amine functional group can react with the anhydride functional group to form an imide functional group and a molecule of water, which can be removed with the solvent. The resulting compound can be reacted with two equivalents of heteroaryl to form the bridging monomer.

Scheme 7. Example of condensation reaction to synthesize a bridging monomer

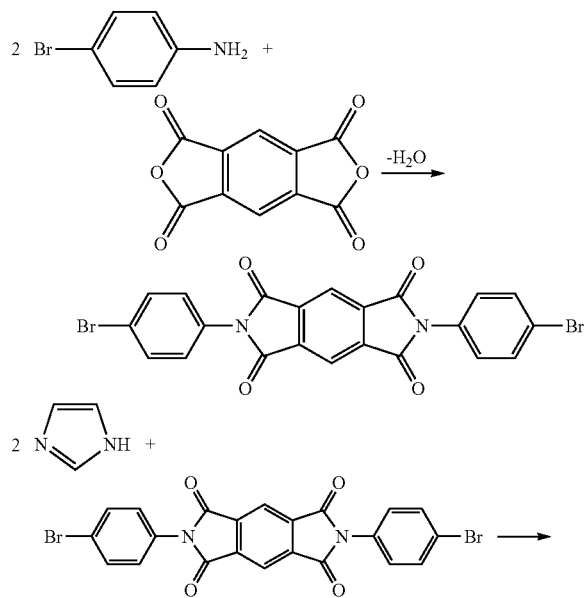

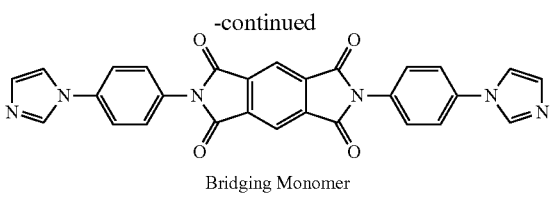

Bridging Monomer

Some suitable solvents include, but are not limited to water, dichloromethane, chloroform, ethyl acetate, tetrahydrofuran, acetone, acetonitrile, N,N-dimethylformamide, or dimethyl sulfoxide. The reaction can also be optionally heated up to 150° C.

The heteroaryl may be deprotonated to react with the imide attached to a halogen. The reaction mixture can be stirred and heated for up to 48 hours to generate the bridging monomer. After the removal the solvent and generated water, the bridging monomer can be isolated.

Alkylation Reaction to Ionize the Heteroaryl

The synthesized bridging monomer can be ionized through an alkylation reaction with a suitable alkylating agent as described above (see e.g., Scheme 4). The bridging monomer can be mixed with the alkylating agent in a suitable solvent. The attached heteroaryl can react with the carbon atom next to one of the leaving groups. This alkylation reaction can positively ionize the bridging monomer and generate a negatively charged anion from leaving group (Scheme 8). By selecting an alkylating agent with at least two leaving groups connected by a suitable bridge as described above, the alkylation reaction can result in the step-growth of a polymer. In some aspects the alkylation reaction forms a dimer, trimer, or a longer polymer.

Scheme 8. Example of alkylation reaction to synthesize an ionic polyimide; n represents the number of repeating monomer units.

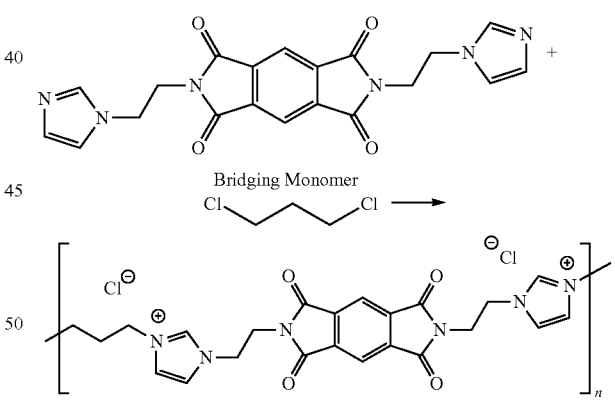

Some suitable solvents include, but are not limited to water, methanol, ethanol, dichloromethane, chloroform, ethyl acetate, tetrahydrofuran, acetone, acetonitrile, N,N-dimethylformamide, or dimethyl sulfoxide. The reaction can also be optionally heated up to 150° C.

The reaction mixture can be stirred and heated for up to 48 hours to generate the alkylated polymer. A person skilled in the art would know other conditions for the reaction. After, the removal the solvent and generated water, the bridging ionic polyimide can be isolated.

Optionally, a salt can be added to the alkylation reaction mixture to change the identity of the anion (Scheme 9). For example, instead of having the anionic version of the leaving group, the anion could be exchanged for another anion, such as but not limited to chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

Scheme 9. Example of alkylation reaction to synthesize an ionic polyimide with an exchanged anion; n represents the number of repeating monomer units

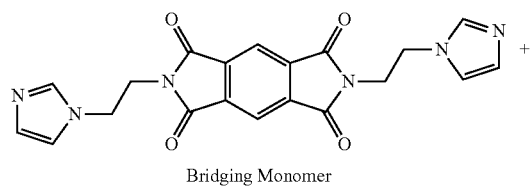

Bridging Monomer separate reaction after the end of the alkylation reaction. Mixing the ionic polyimide with a salt that has a different anion can exchange one anion for another (Scheme 10). For example, the anion could be exchanged for another anion, such as but not limited to chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

Some suitable solvents for the methathesis include, but are not limited to water, methanol, ethanol, dichloromethane, chloroform, ethyl acetate, tetrahydrofuran, acetone, acetonitrile, N,N-dimethylformamide, or dimethyl sulfoxide. The reaction can also be optionally heated up to 150° C.

The reaction mixture can be stirred and heated for up to 48 hours to generate the alkylated polymer. A person skilled in the art would know other conditions for the reaction. After the removal the solvent and generated water, the bridging ionic polyimide can be isolated.

Scheme 10. Example of a metathesis reaction; n represents the number of repeating monomer units

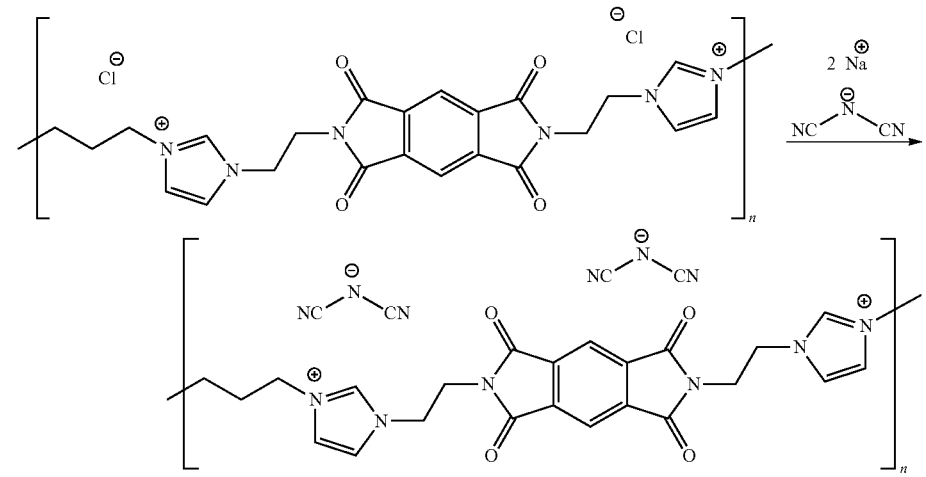

-continued

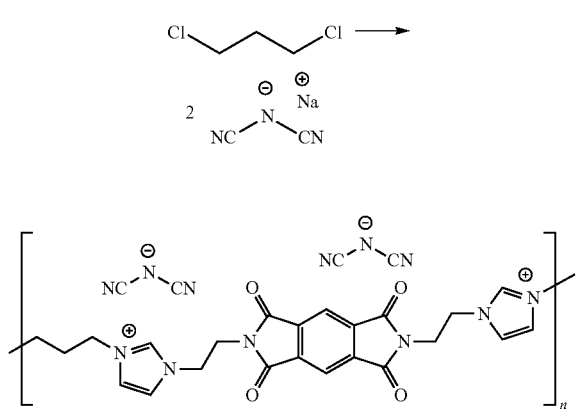

Metathesis Reaction

Instead of exchanging the anion during the alkylation reaction, the anion can also be optionally exchanged in a Ionic Polyimide Design The heteroaryl structures can been chosen to influence H-bonding by reducing/blocking or enhancing the ability of the heteroaryl ring to undergo these types of interactions. The components can be selected to form highly porous, structured architectures that can be translatable to ionic polyimides formed with covalent bonds.

However, retention of helix structures in the final ionic polyimide can be dependent on the use of a rigid linker group, such as para- or meta-xylyl, cyclohexyl or similar structures that can provide additional frustrations to chain packing, i.e. the ionic polyimide must be constructed based upon the same principles that have driven the performance of conventional polyimides.

Finally, the selection of the anion can play a role in the overall structure and supramolecular assembly of ionic polyimides. Based on analogy to ILs and poly(ILs), halide anions can provide larger $T_g/T_m$ values and stronger H-bonds than the molecular anions which can aid organization. However, molecular anions such as $BF_4$ and $Tf_2N$ can still exhibit these H-bonding interactions and can produce a more tractable polymer.

Compositions of Ionic Liquids

In some examples, an ionic polyimide can be mixed with an ionic liquid. Some suitable examples are provided herein.

In one aspect, disclosed herein are ionic liquid compositions. The term "ionic liquid" has many definitions in the art, but is used herein to refer to salts (i.e., compositions comprising cations and anions) that are liquid at a temperature of at or below about 150° C., e.g., at or below about 120, 100, 80, 60, 40, or 25° C. That is, at one or more temperature ranges or points at or below about 150° C. the disclosed ionic liquid compositions are liquid; although, it is understood that they can be solids at other temperature ranges or points. Since the disclosed ionic liquid compositions are liquid, and thus not crystalline solids, at a given temperature, the disclosed compositions do not suffer from the problems of polymorphism associated with crystalline solids. An ionic liquid is not considered a mere solution containing ions as solutes dissolved therein.

The use of the term "liquid" to describe the disclosed ionic liquid compositions is meant to describe a generally amorphous, non-crystalline, or semi-crystalline state. For example, while some structured association and packing of cations and anions can occur at the atomic level, the disclosed ionic liquid compositions have minor amounts of such ordered structures and are therefore not crystalline solids. The compositions disclosed herein can be fluid and free-flowing liquids or amorphous solids such as glasses or waxes at a temperature at or below about 150° C. In particular, examples disclosed herein, the disclosed ionic liquid compositions are liquid at which the composition is applied (i.e., ambient temperature).

Further, the disclosed ionic liquid compositions are materials composed of at least two different ions; each of which can independently and simultaneously introduce a specific characteristic to the composition not easily obtainable with traditional dissolution and formulation techniques. Thus, by providing different ions and ion combinations, one can change the characteristics or properties of the disclosed ionic liquid compositions in a way not seen by simply preparing various crystalline salt forms. Examples of characteristics that can be controlled in the disclosed compositions include, but are not limited to, melting, solubility control, and rate of dissolution. It is this multi-nature/functionality of the disclosed ionic liquid compositions which allows one to fine-tune or design in very specific desired material properties.

It is further understood that the disclosed ionic liquid compositions can include solvent molecules (e.g., water); however, these solvent molecules should not be present in excess in the sense that the disclosed ionic liquid compositions are dissolved in the solvent, forming a solution. That is, the disclosed ionic liquid compositions contain no or minimal amounts of solvent molecules that are free and not bound or associated with the ions present in the ionic liquid composition. Thus, the disclosed ionic liquid compositions can be liquid hydrates or solvates, but not solutions.

Ionic liquids have been of general interest because they are environmentally-friendly alternatives to organic solvents for various chemical processes, e.g., liquid/liquid extractions, catalysis, separations, and electrochemistry. Ionic liquids have also become popular alternative media for chemical synthesis because of their low volatility and low toxicity. See e.g., Wasserscheid and Keim, *Angew Chem Int Ed Engl*, 2000, 39:3772; and Wasserscheid, "Ionic Liquids in Synthesis," 1$^{st}$ Ed., Wiley-VCH, 2002. Further, ionic liquids can reduce costs, disposal requirements, and hazards associated with volatile organic compounds. Other exemplary properties of ionic liquids are high ionic conductivity, non-volatility, non-flammability, high thermal stability, wide temperature for liquid phase, highly solvability, and non-coordinating. For a review of ionic liquids see, for example, Welton, *Chem Rev.* 1999, 99:2071-2083; and Carlin et al., Advances in Nonaqueous Chemistry, Mamantov et al. Eds., VCH Publishing, New York, 1994.

The specific physical properties (e.g., melting point, viscosity, density, water solubility, etc.) of ionic liquids are determined by the choice of cation and anion, as is disclosed more fully herein. As an example, the melting point for an ionic liquid can be changed by making structural modifications to the ions or by combining different ions. Similarly, the particular chemical properties (e.g., bioactivity, toxicity, pharmacokinetics, etc.), can be selected by changing the constituent ions of the ionic liquid.

The disclosed ionic liquids care liquid at some temperature range or point at or below about 150° C. For example, the disclosed ionic liquids can be a liquid at or below about 150, 149, 148, 147, 146, 145, 144, 143, 142, 141, 140, 139, 138, 137, 136, 135, 134, 133, 132, 131, 130, 129, 128, 127, 126, 125, 124, 123, 122, 121, 120, 119, 118, 117, 116, 115, 114, 113, 112, 111, 110, 109, 108, 107, 106, 105, 104, 103, 102, 101, 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, 0, −1, −2, −3, −4, −5, −6, −7, −8, −9, −10, −11, −12, −13, −14, −15, −16, −17, −18, −19, −20, −21, −22, −23, −24, −25, −26, −27, −28, −29, or −30° C., where any of the stated values can form an upper or lower endpoint when appropriate. In further examples, the disclosed ionic liquids can be liquid at any point from about −30° C. to about 150° C., from about −20° C. to about 140° C., −10° C. to about 130° C., from about 0° C. to about 120° C., from about 10° C. to about 110° C., from about 20° C. to about 100° C., from about 30° C. to about 90° C., from about 40° C. to about 80° C., from about 50° C. to about 70° C., from about −30° C. to about 50° C., from about −30° C. to about 90° C., from about −30° C. to about 110° C., from about −30° C. to about 130° C., from about −30° C. to about 150° C., from about 30° C. to about 90° C., from about 30° C. to about 110° C., from about 30° C. to about 130° C., from about 30° C. to about 150° C., from about 0° C. to about 100° C., from about 0° C. to about 70° C., from about 0° to about 50° C., and the like.

Further, in some examples the disclosed ionic liquid compositions can be liquid over a wide range of temperatures, not just a narrow range of, say, 1-2 degrees. For example, the disclosed ionic liquid compositions can be liquids over a range of at least about 4, 5, 6, 7, 8, 9, 10, or more degrees. In other example, the disclosed ionic liquid compositions can be liquid over at least about a 11, 12, 13, 14, 15, 16, 17, 18, 19, 20, or more degree temperature range. Such temperature ranges can begin and/or end at any of the temperature points disclosed in the preceding paragraph.

In many examples disclosed herein the disclosed ionic liquid compositions are liquid at the temperature at which they will be used or processed (e.g., ambient temperature). In still other examples, the disclosed compositions can be liquid at the temperature at which they are formulated or processed.

It is understood, however, that the disclosed ionic liquid compositions can, though need not, be solubilized, and solutions of the disclosed ionic liquids are contemplated herein. Further, the disclosed ionic liquid compositions can be formulated in an extended or controlled release vehicle, for example, by encapsulating the ionic liquids in microspheres or microcapsules using methods known in the art. Still further, the disclosed ionic liquid compositions can themselves be solvents for other solutes. For example, the disclosed ionic liquids can be used to dissolve a particular nonionic or ionic herbicidal active. These and other formulations of the disclosed ionic liquids are disclosed elsewhere herein.

In some examples, the disclosed ionic liquids are not solutions where ions are dissolved in a solute. In other examples, the disclosed ionic liquid compositions do not contain ionic exchange resins. In still other examples, the disclosed ionic liquids are substantially free of water. By substantially free is meant that water is present at less than about 10, 9, 8, 7, 6, 5, 4, 3, 2, 1, 0.5, 0.25, or 0.1 wt. %, based on the total weight of the composition.

Cations

Particular examples of cationic compounds that can be present in the disclosed compositions are compounds that contain nitrogen or phosphorus atoms. Nitrogen atom-containing groups can exist as neutral or can be converted to positively-charged quaternary ammonium species, for example, through alkylation or protonation of the nitrogen atom. Thus, compounds that possess a quaternary nitrogen atom (known as quaternary ammonium compounds (QACs)) are typically cations. According to the methods and compositions disclosed herein, any compound that contains a quaternary nitrogen atom or a nitrogen atom that can be converted into a quaternary nitrogen atom can be a suitable cation for the disclosed compositions. In some examples, the cation is not a protonated tertiary amine, a protonated heteroarylamine, a protonated pyrrolidine, or a metal.

Some specific QACs suitable for use herein are aliphatic heteroaryls. An aliphatic heteroaryl cation is a compound that comprises at least one aliphatic moiety bonded to a heteroaryl moiety. In the aliphatic heteroaryl cation, the aliphatic moiety can be any alkyl, alkenyl, alkynyl, heteroalkyl, heteroalkenyl, heteroalkynyl, cycloalkyl, cycloalkenyl, heterocycloalkyl, or heterocycloalkenyl group, as described herein. For example, the aliphatic moiety can include substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl substituted or unsubstituted $C_{2-20}$ heteroalkenyl, or substituted or unsubstituted $C_{2-20}$ heteroalkynyl groups. In the aliphatic heteroaryl cations, the aliphatic moiety is bonded to a heteroatom in the heteroaryl moiety.

In the aliphatic heteroaryl cation, the heteroaryl moiety can be any heteroaryl moiety as described herein. For example, the heteroaryl moiety can be an aryl group having one or more heteroatoms (e.g., nitrogen, oxygen, sulfur, phosphorous, or halonium). Examples of specific heteroaryl moieties that can be used in the aliphatic heteroaryl cations include, but are not limited to, substituted or unsubstituted pyrazoles, substituted or unsubstituted pyridines, substituted or unsubstituted pyrazines, substituted or unsubstituted pyrimidines, substituted or unsubstituted pryidazines, substituted or unsubstituted indolizines, substituted or unsubstituted isoindoles, substituted or unsubstituted indoles, substituted or unsubstituted indazoles, substituted or unsubstituted imidazoles, substituted or unsubstituted oxazoles, substituted or unsubstituted triazoles, substituted or unsubstituted thiazoles, substituted or unsubstituted purines, substituted or unsubstituted isoquinolines, substituted or unsubstituted quinolines, substituted or unsubstituted phthalazines, substituted or unsubstituted quinooxalines, substituted or unsubstituted phenazine, and the like, including derivatives and mixtures thereof. In the aliphatic heteroaryl cations, a heteroatom in the heteroaryl moiety is bonded to the aliphatic moiety. When the heteroatom of the heteroaryl is nitrogen, this forms a quaternary ammonium cation, as described herein.

Further examples of aliphatic heteroaryl cations include substituted or unsubstituted benztriazoliums, substituted or unsubstituted benzimidazoliums, substituted or unsubstituted benzothiazoliums, substituted or unsubstituted pyridiniums, substituted or unsubstituted pyridaziniums, substituted or unsubstituted pyrimidiniums, substituted or unsubstituted pyraziniums, substituted or unsubstituted imidazoliums, substituted or unsubstituted pyrazoliums, substituted or unsubstituted oxazoliums, substituted or unsubstituted 1,2,3-triazoliums, substituted or unsubstituted 1,2,4-triazoliums, substituted or unsubstituted thiazoliums, substituted or unsubstituted piperidiniums, substituted or unsubstituted pyrrolidiniums, substituted or unsubstituted quinoliums, and substituted or unsubstituted isoquinoliums.

Tetraalkyl Ammonium

The disclosed compositions can also comprise a tetraalkyl ammonium cation. Suitable tetraalkyl ammonium cations comprise four alkyl moieties, as disclosed herein. In one example, a tetraalkyl ammonium cation can comprise one long chain alkyl moiety (e.g., 10 or more carbon atoms in length) and three short chain alkyl moieties (e.g., less than 10 carbon atoms in length).

Some specific examples of tetraalkyl ammonium cations that can be included in the disclosed compositions include, but are not limited to, cetyl trimethyl ammonium, lauryl trimethyl ammonium, myristyl trimethyl ammonium, stearyl trimethyl ammonium, arachidyl trimethyl ammonium, or mixtures thereof. Other examples include, but are not limited to, cetyl dimethylethyl ammonium, lauryl dimethylethyl ammonium, myristyl dimethylethyl ammonium, stearyl dimethylethyl ammonium, arachidyl dimethylethyl ammonium, or mixtures thereof.

Anions

Some suitable anions include, but are not limited to, chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, or tosylate.

Compositions of Ionic Polyimides and Ionic Liquids

An additional dimension of control over material structure, properties and performance can be the introduction of "free" IL into the polymer matrix that can further serve to aid assembly via selective, non-covalent interactions with the ionic segments of the polymer backbone. This concept has been applied to amorphous "side-chain" poly(ILs) and ionenes to improve $CO_2$ permeability compared to the neat polymer material alone. Lodge and co-workers have successfully applied such approaches to the self-assembly of linear block copolymers containing polar or ionic blocks within non-polar polystyrene blocks, with promising results for a $CO_2$ separation membrane. (See He et al., *J. Am. Chem. Soc.* 128 (2006) 2745-50.) However, although such polymer materials exhibit improved performance when ILs are included in the membrane, they can be largely composed of a relatively impermeable poly(styrene) component, can rely on radical polymerization mechanisms and can lack the unique folds and twists that can be imparted by some molecules like 6-FDA. Thus the introduction of "free" ILs into ionic polyimides can provide the driving force needed create highly open, yet ordered nanostructures.

Gas Capture with Ionic Polyimides

Disclosed herein are methods to capture gases utilized disclosed compositions. These compositions are useful for reducing volatile compounds, such as carbon dioxide ($CO_2$), carbon monoxide (CO), sulfur dioxide ($SO_2$), hydrogen sulfide ($H_2S$), nitrogen oxide (NO), nitrogen dioxide ($NO_2$), carbonyl sulfide (COS), and carbon disulfide ($CS_2$), mercaptans, $H_2O$, $O_2$, $H_2$, $N_2$, $C_1$-$C_8$ hydrocarbons (e.g., methane and propane), volatile organic compounds, and mixtures of these and other volatile compounds from gas streams and liquid streams.

Contacting a gas stream with a membrane comprising an ionic polyimide can result in the absorption of volatile compounds. Contacting a gas stream with a membrane comprising an ionic polyimide and an ionic liquid can result in the absorption of volatile compounds.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

All chemicals used were of analytical grade, purchased from Sigma-Aldrich (St. Louis, Mo.) or Alfa Aesar (Ward Hil, Mass.), and used without further purification unless otherwise noted.

Example 1

Ionic Polyimide synthesized from 1-(3-aminopropyl)-2,4,5-trimethylimidazole, 6-FDA and 1,4-dichlorodurene 2 equivalents of 1-(3-aminopropyl)-2,4,5-trimethylimidazole) can be mixed with 6-FDA in N,N-dimethylformamide. The reaction can be stirred for 16 hours at 120° C., to generate a bridging monomer. An equivalent molar ratio of alkylating agent and lithium bis(trifluoromethane)sulfonimide. The composition can be stirred for an additional 16 hours at 120° C. to generate an ionic polyimide (see Scheme 11).

Scheme 11. Ionic Polyimide synthesized from 1-(3-aminopropyl)-2,4,5-trimethylimidazole, 6-FDA and 1,4-dichlorodurene

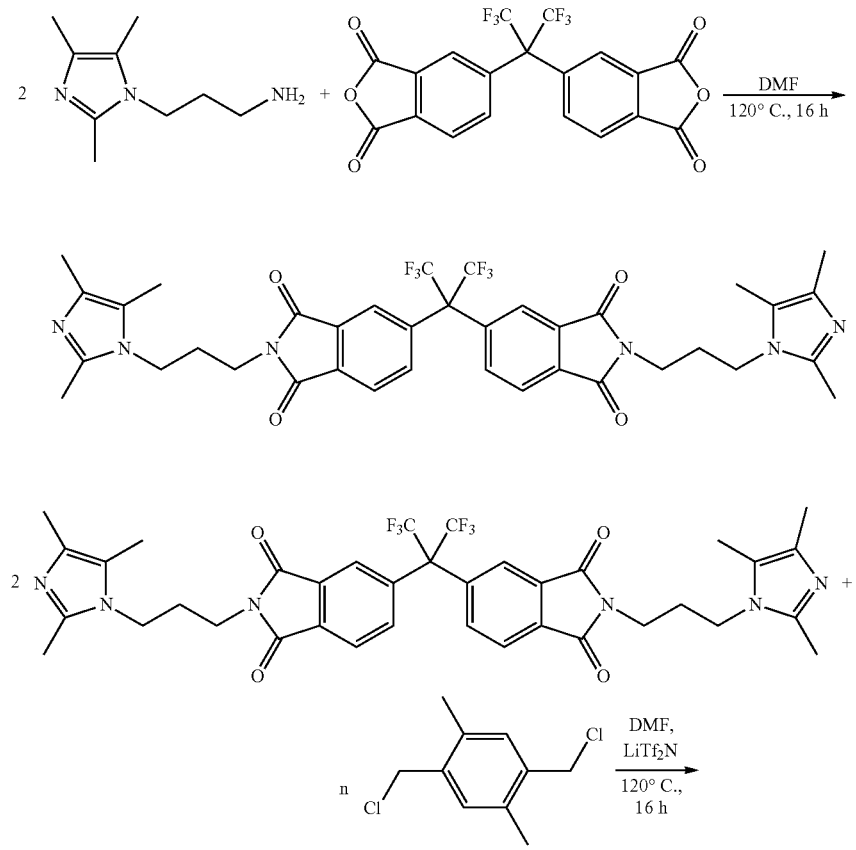

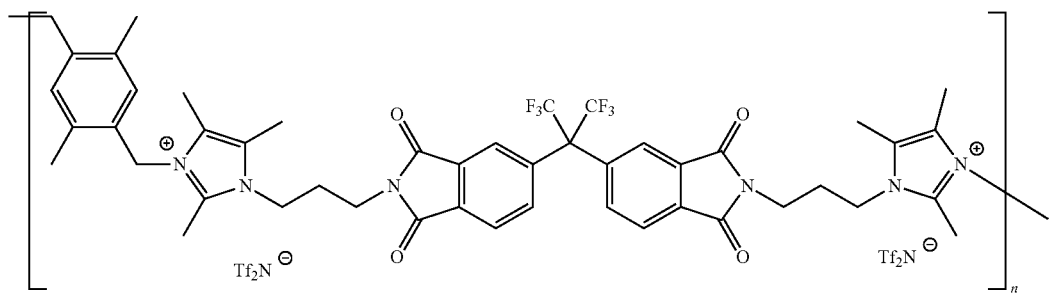

Example 2

Ionic Polyimide synthesized from imidazole, p-bromoaniline, PMDA and α domdichloro-p-xylene 2 equivalents of p-bromoaniline can be reacted with PMDA in dimethylformamide. The reaction can be stirred at 150° C. for 16 hours. The product is reacted with 2 equivalents of imidazole with cesium carbonate, copper iodide for an additional 48 hours in dimethylformamide at 150° C. to generate the bridging monomer. The bridging monomer can be alkylated with α,α″-dichloro-p-xylene in the presence of lithium bis(trifluoromethane)sulfonimide in N-methyl-2-pyrrolidone at 150° C. for an additional 16 hours. The ionic polyimide can be separated from the reaction mixture.

Scheme 12. Ionic Polyimide synthesized from imidazole, p-bromoaniline, PMDA AND α, α′-dichloro-p-xylene

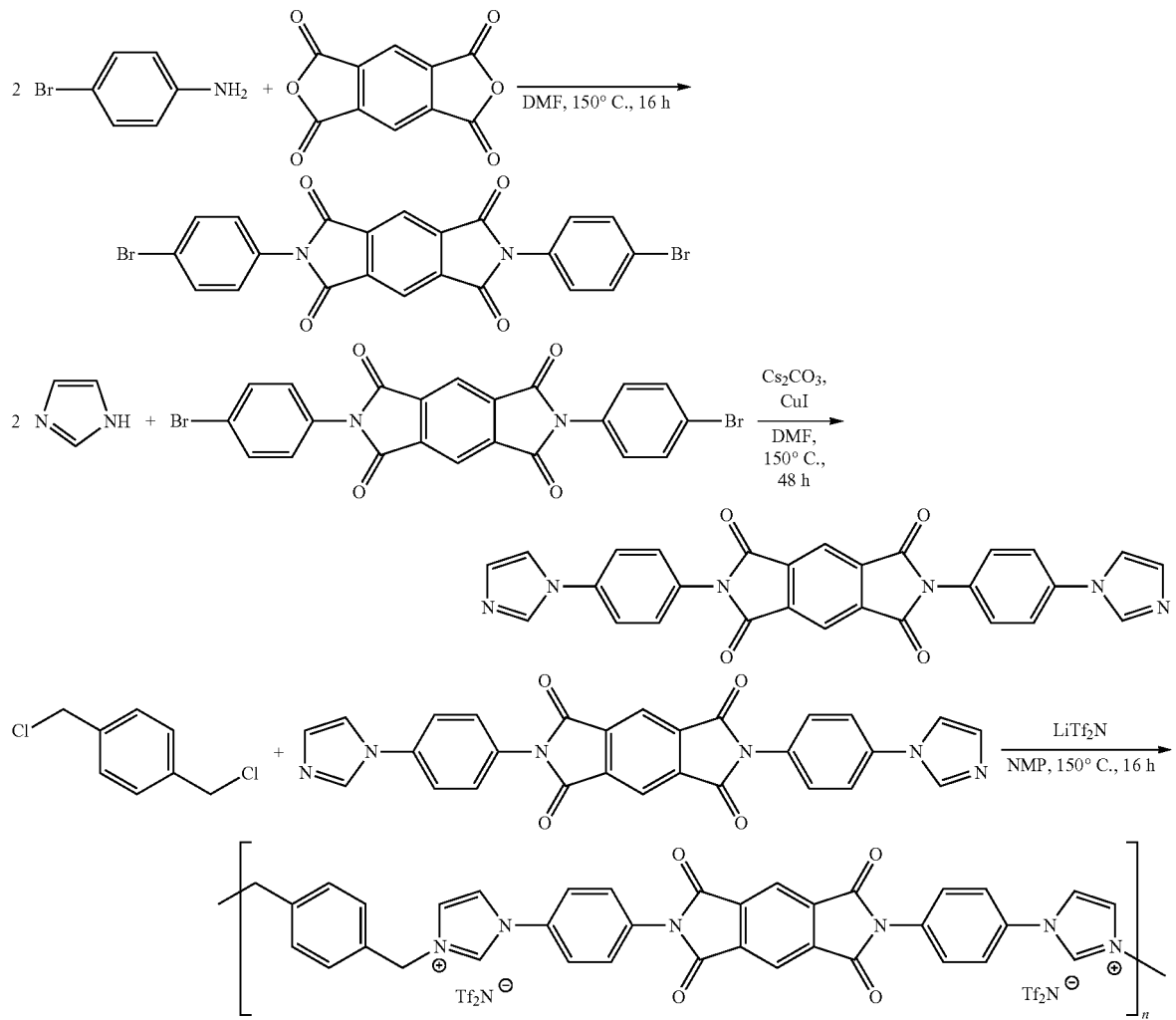

Example 3

Pressing of an Ionic Polyimide into a Film for $CO_2$ Capture

Approximately 1.00 g of material was pressed at 220° C. into a thin film of about 200 μm thickness and >60 mm in diameter. A 47 mm disc was punched from the larger film and then tested in a time-lag membrane apparatus. The $CO_2$ permeability of this initial material was determined to be relatively low (about 1 Barrer), and as such, other gases were not tested. The low permeability of $CO_2$ in the ionic polyimide described in Example 1 is not unexpected as PMDA is not typically employed in conventional aromatic polyimide materials due to its rigidity. Initial SEM and XRD characterization results show that the ionic polyimide based on PMDA is relatively amorphous with some crystalline regions), which is correlated to the low permeability level observed in this first material.

Example 4

Pressing of an Ionic Polyimide with 25 wt. % 1-ethyl-3-methylimidazolium bis(trifluoromethane)sulfonamide into a Film for $CO_2$ Capture The ionic polyimide based on PMDA can directly interface with ILs, as evidenced by the formation of a stable, composite material containing the polymer with ~25 wt % of the IL, [$C_2$ mim][$Tf_2$N], which is stoichiometrically equivalent to one additional "free" cation-anion pair per two cation-anion pairs within/associated to the original polymer backbone. Upon addition of the IL, the polymer material becomes more pliable and optically cloudy (FIG. 1), which can be indicative of supramolecular ordering, and validating the hypothesis that ionic polyimides can accommodate significant quantities of "free" ILs within their structures and remain mechanically stable solids.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A composition, comprising an ionic polyimide having the formula:

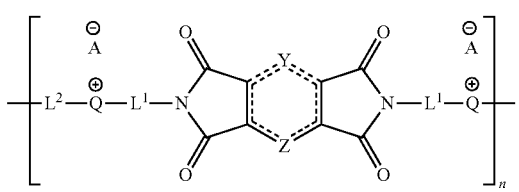

wherein,
Y is selected from the group consisting of null, hydrogen, halogen, hydroxyl, carbonyl, O, S, $SO_2$, cyano, $C(CF_3)_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted cycloalkyl, substituted or unsubstituted heterocycloalkyl, substituted or unsubstituted aryl, and substituted or unsubstituted heteroaryl;

Z is selected from the group consisting of CH, $CH_2$, carbonyl, O, S, $SO_2$, cyano, $C(CF_3)_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted cycloalkyl, substituted or unsubstituted heterocycloalkyl, substituted or unsubstituted aryl, and substituted or unsubstituted heteroaryl;

$L^1$ and $L^2$ are selected from the group consisting of branched and unbranched alkyl, alkenyl, and alkynyl groups having 1 to 12 carbon atoms, substituted or unsubstituted aryl, and substituted or unsubstituted heteroaryl, and mixture thereof;

Q is an ionized heteroaryl;

A is an anion; and n is an integer from 1 to 100,000.

2. The composition of claim 1, wherein Q is selected from the group consisting of substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, and substituted or unsubstituted morpholininium.

3. The composition of claim 1, wherein Q is substituted with a functional group selected from the group consisting of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, and thiol.

4. The composition of claim 1, wherein Q is imidazolium.

5. The composition of claim 1, wherein A is selected from the group consisting of chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, and tosylate.

6. The composition of claim 1, wherein Y and Z together with the atoms to which they are attached form a substituted or unsubstituted triptycene.

7. The composition of claim 1, wherein the ionic polyimide is selected from the group consisting of:

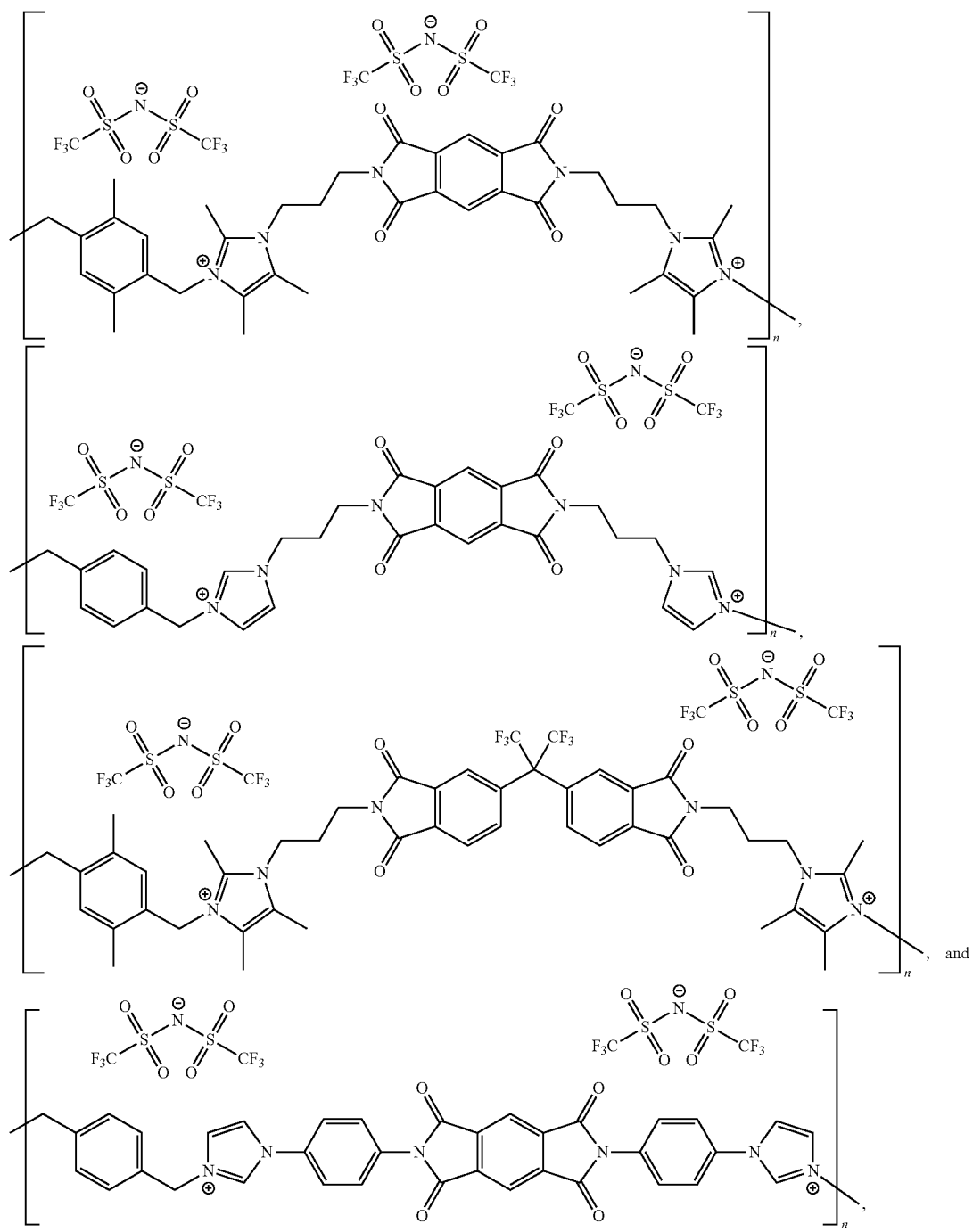

wherein n is an integer from 1 to 100,000.

8. The composition of claim 1, wherein n is an integer from 10 to 5,000.

9. The composition of claim 1, further comprising an ionic liquid having the formula:

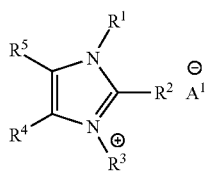

wherein, $R^1$, $R^2$, $R^3$, $R^4$, and $R^5$ are, independent of one another, selected from the group consisting of hydrogen, branched or unbranched $C_{1-12}$ alkyl, branched or unbranched $C_{2-12}$ alkenyl, and branched or unbranched $C_{2-12}$ alkynyl; and $A^1$ is an anion.

10. The composition of claim 9, wherein A and $A^1$ are independently selected from the group consisting of chloride, bromide, iodide, nitrate, dicyanamide, acetate, bis(trifluoromethane)sulfonamide, hexafluorophosphate, tetrafluoroborate, sulfate, phosphate, tris(perfluoroalkyl)

trifluorophosphatemesylate, aluminum chloride, thiocyanide, mesylate, triflate, and tosylate.

11. The composition of claim 9, wherein the ionic liquid is 1-ethyl-3-methylimidazolium bis(trifluoromethane)sulfonamide.

12. The composition of claim 11, wherein the ionic polyimide is selected from the group consisting of:

13. The composition of claim 9, wherein n is an integer from 10 to 5,000.

14. A method for capturing carbon dioxide from a gas stream, comprising:
  feeding the gas stream through a membrane, wherein the membrane comprises an ionic polyimide having the following structure:

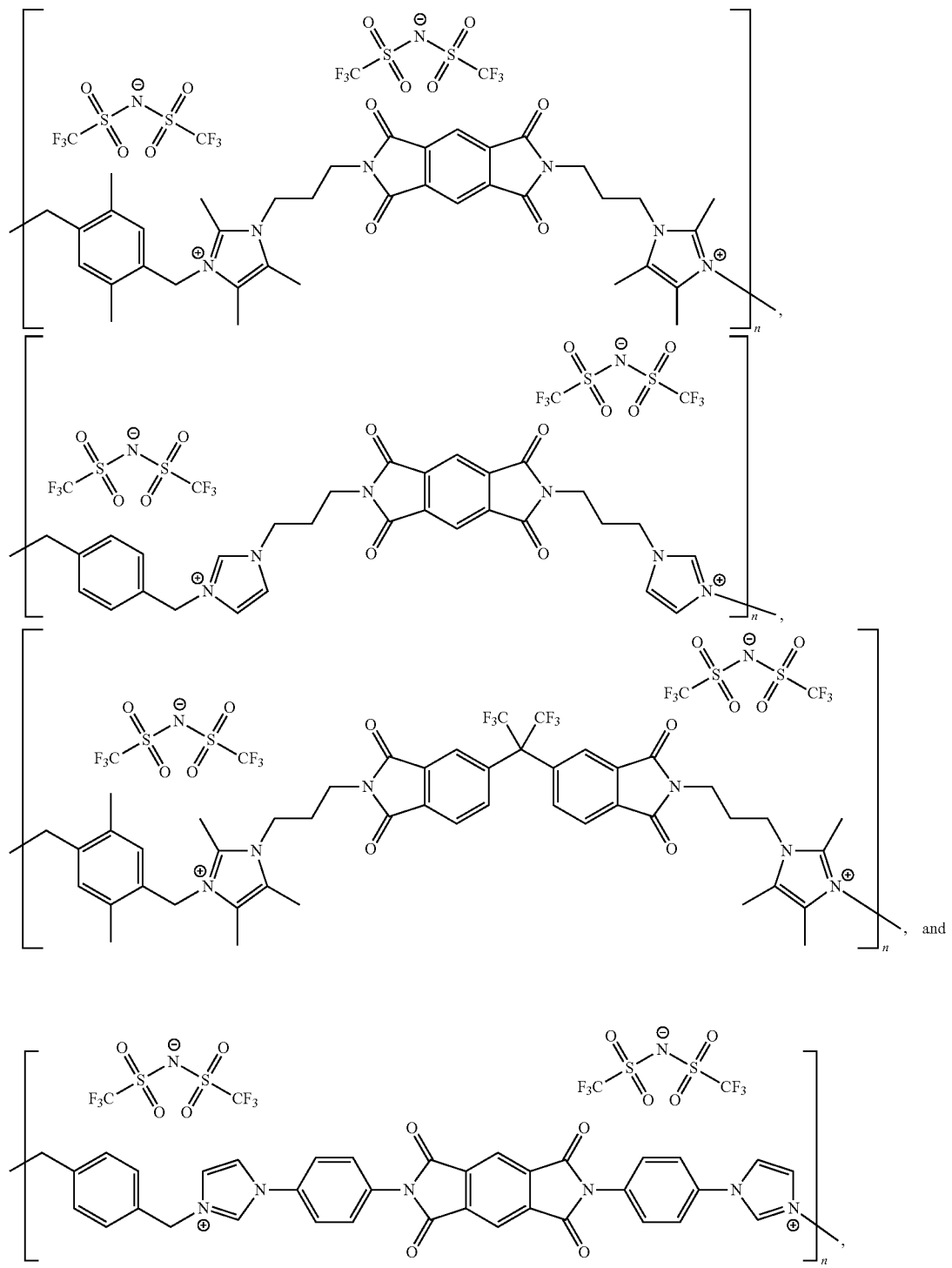

wherein n is an integer from 1 to 100,000.

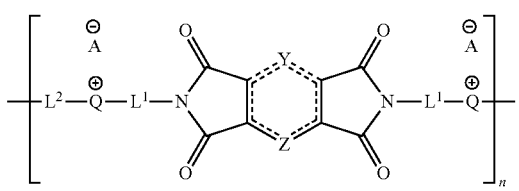

wherein,
Y is selected from the group consisting of null, hydrogen, halogen, hydroxyl, carbonyl, O, S, $SO_2$, cyano, $C(CF_3)_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted cycloalkyl, substituted or unsubstituted heterocycloalkyl, substituted or unsubstituted aryl, substituted or unsubstituted triptycene, and substituted or unsubstituted heteroaryl;

Z is selected from the group consisting of CH, $CH_2$, carbonyl, O, S, $SO_2$, cyano, $C(CF_3)_2$, substituted or unsubstituted $C_{1-20}$ alkyl, substituted or unsubstituted $C_{2-20}$ alkenyl, substituted or unsubstituted $C_{2-20}$ alkynyl, substituted or unsubstituted $C_{1-20}$ heteroalkyl, substituted or unsubstituted $C_{2-20}$ heteroalkenyl, substituted or unsubstituted cycloalkyl, substituted or unsubstituted heterocycloalkyl, substituted or unsubstituted aryl, substituted or unsubstituted triptycene, and substituted or unsubstituted heteroaryl;

$L^1$ and $L^2$ are selected from the group consisting of branched and unbranched alkyl, alkenyl, and alkynyl groups having 1 to 12 carbon atoms, substituted or unsubstituted aryl, and substituted or unsubstituted heteroaryl, and mixture thereof;

Q is an ionized heteroaryl;
A is an anion; and
n is an integer from 1 to 100,000.

15. The method of claim 14, wherein Q is selected from the group consisting of substituted or unsubstituted pyrazolium, substituted or unsubstituted pyridinium, substituted or unsubstituted pyrazinium, substituted or unsubstituted pyrimidinium, substituted or unsubstituted pryidazinium, substituted or unsubstituted piperidinium, substituted or unsubstituted pyrrolidinium, substituted or unsubstituted indolizinium, substituted or unsubstituted isoindolium, substituted or unsubstituted indolium, substituted or unsubstituted indazolium, substituted or unsubstituted imidazolium, substituted or unsubstituted oxazolium, substituted or unsubstituted triazolium, substituted or unsubstituted tetrazolium, substituted or unsubstituted thiazolium, substituted or unsubstituted purinium, substituted or unsubstituted isoquinolinium, substituted or unsubstituted quinolinium, substituted or unsubstituted phthalazinium, substituted or unsubstituted quinooxalinium, substituted or unsubstituted phenazinium, and substituted or unsubstituted morpholinium.

16. The method of claim 14, wherein Q is substituted with a functional group selected from the group consisting of alkyl, halogen, alkoxyl, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, and thiol.

17. The method of claim 14, wherein Q is imidazolium.

18. The method of claim 14, wherein A is selected from the group consisting of chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, and tosylate.

19. The method of claim 14, wherein Y and together with the atoms to which they are attached form a substituted or unsubstituted triptycene.

20. The method of claim 14, wherein the ionic polyimide is selected from the group consisting of:

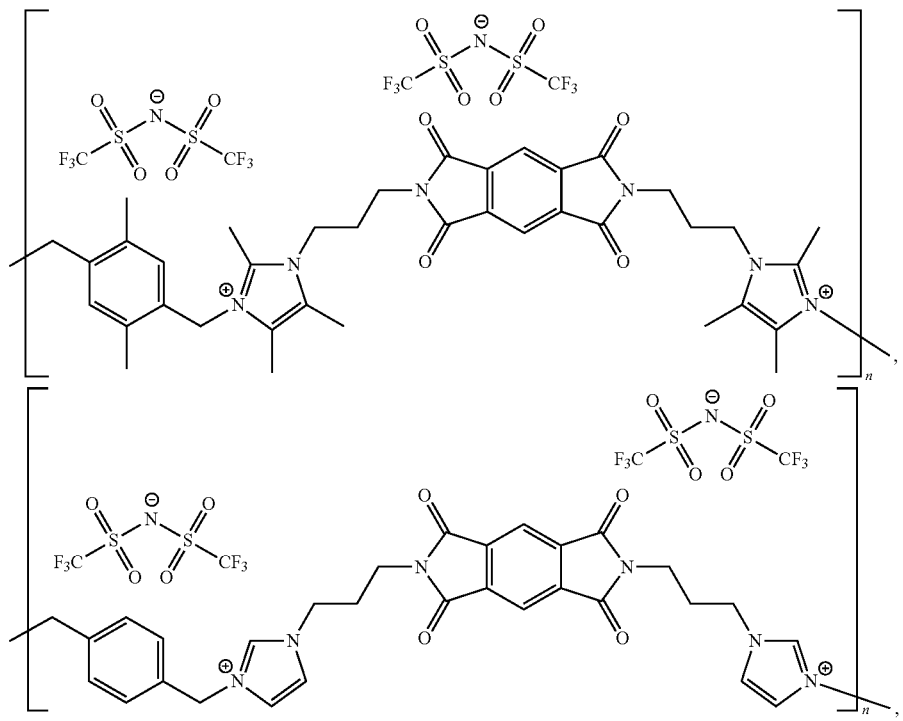

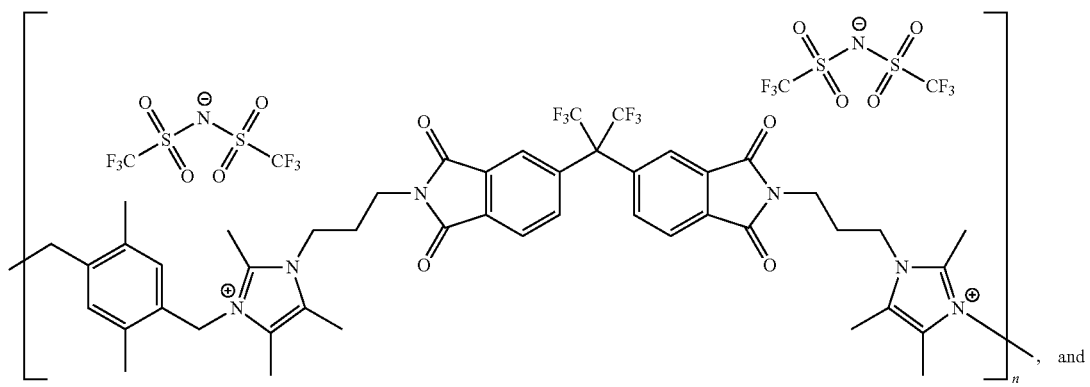

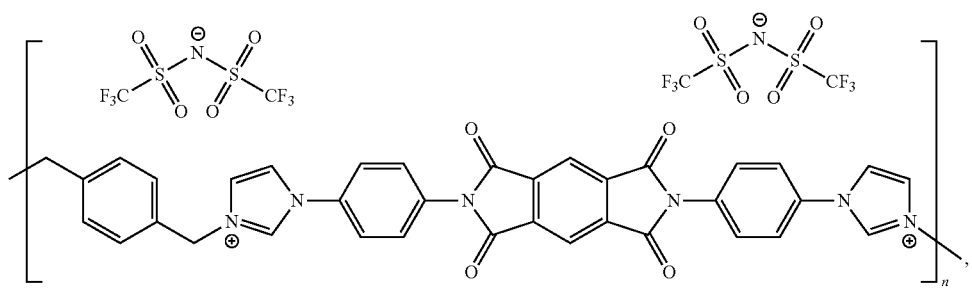

wherein n is an integer from 1 to 100,000.

21. The method of claim 14, wherein n is an integer from 10 to 5,000.

22. The method of claim 14, wherein the membrane further comprises an ionic liquid having the formula:

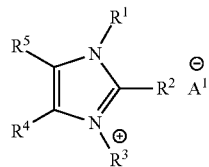

wherein, $R^1$, $R^2$, $R^3$, $R^4$, and $R^5$ are, independently of each other, selected from the group consisting of hydrogen and branched and unbranched alkyl, alkenyl, and alkynyl groups having 1 to 12 carbon atoms; and $A^1$ is an anion.

23. The method of claim 22, wherein A and $A^1$ are independently selected from the group consisting of chloride, bromide, iodide, nitrate, dicyanamide, acetate, bis(trifluoromethane)sulfonamide, hexafluorophosphate, tetrafluoroborate, sulfate, phosphate, tris(perfluoroalkyl)trifluorophosphatemesylate, aluminum chloride, thiocyanide, mesylate, triflate, and tosylate.

24. The method of claim 22, wherein the ionic liquid is 1-ethyl-3-methylimidazolium bis(trifluoromethane)sulfonamide.

25. The method of claim 24, wherein the ionic polyimide is selected from the group consisting of:

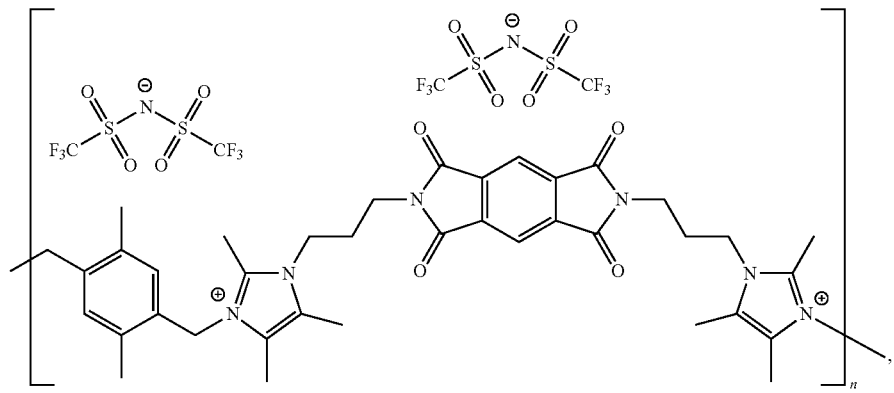

-continued
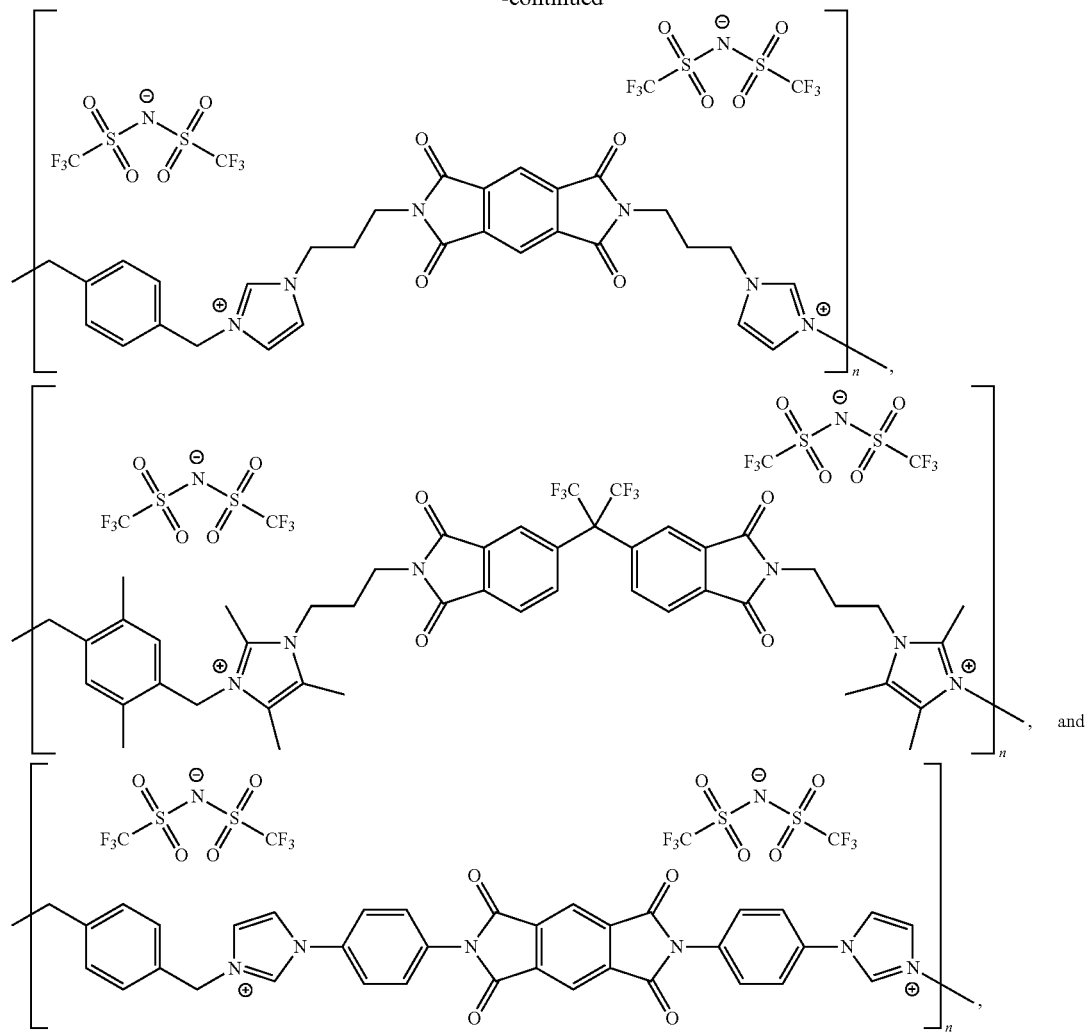
wherein n is an integer from 1 to 100,000.
26. The method of claim 22, wherein n is an integer from 10 to 5,000.
27. The method of claim 14, wherein the gas stream is a flue gas or post-combustion stream.
* * * * *

UNITED STATES PATENT AND TRADEMARK OFFICE
CERTIFICATE OF CORRECTION

PATENT NO. : 9,845,380 B2
APPLICATION NO. : 14/982386
DATED : December 19, 2017
INVENTOR(S) : Jason E. Bara et al.

Page 1 of 1

It is certified that error appears in the above-identified patent and that said Letters Patent is hereby corrected as shown below:

In the Specification

Please replace the formula I Column 9, Lines 10-20, with the following:

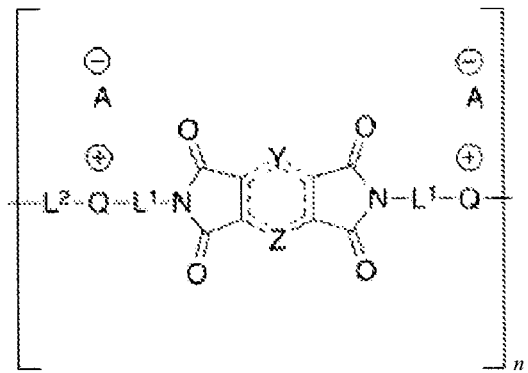

Signed and Sealed this
Sixth Day of February, 2018

Joseph Matal
*Performing the Functions and Duties of the*
*Under Secretary of Commerce for Intellectual Property and*
*Director of the United States Patent and Trademark Office*